US009606986B2

(12) United States Patent
Bellegarda

(10) Patent No.: US 9,606,986 B2
(45) Date of Patent: Mar. 28, 2017

(54) INTEGRATED WORD N-GRAM AND CLASS M-GRAM LANGUAGE MODELS

(71) Applicant: Apple Inc., Cupertino, CA (US)

(72) Inventor: Jerome R. Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 14/503,370

(22) Filed: Sep. 30, 2014

(65) Prior Publication Data

US 2016/0092434 A1 Mar. 31, 2016

Related U.S. Application Data

(60) Provisional application No. 62/057,177, filed on Sep. 29, 2014.

(51) Int. Cl.
*G06F 17/27* (2006.01)
*G06F 17/28* (2006.01)

(52) U.S. Cl.
CPC ........ *G06F 17/279* (2013.01); *G06F 17/2715* (2013.01); *G06F 17/289* (2013.01)

(58) Field of Classification Search
None
See application file for complete search history.

(56) References Cited

U.S. PATENT DOCUMENTS 4,384,169 A 5/1983 Mozer et al.
4,513,435 A 4/1985 Sakoe et al.
4,577,343 A 3/1986 Oura
4,654,875 A 3/1987 Srihari et al.
4,670,848 A 6/1987 Schramm
4,709,390 A 11/1987 Atal et al.
4,713,775 A 12/1987 Scott et al.
(Continued)

FOREIGN PATENT DOCUMENTS

CN 1864204 A 11/2006
DE 4126902 A1 2/1992
(Continued)

OTHER PUBLICATIONS

Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
(Continued)

*Primary Examiner* — Benny Q Tieu
*Assistant Examiner* — Sunil Chacko
(74) *Attorney, Agent, or Firm* — Morrison & Foerster LLP

(57) ABSTRACT

Systems and processes for discourse input processing are provided. In one example process, a discourse input can be received from a user. An integrated probability of a candidate word in the discourse input and one or more subclasses associated with the candidate word can be determined based on a conditional probability of the candidate word given one or more words in the discourse input, a probability of the candidate word within a corpus, and a conditional probability of the candidate word given one or more classes associated with the one or more words. A text string corresponding to the discourse input can be determined based on the integrated probability. An output based on the text string can be generated.

24 Claims, 10 Drawing Sheets

Process 400

RECEIVE DISCOURSE INPUT — 402

DETERMINE TEXT STRING CORRESPONDING TO DISCOURSE INPUT — 404

DETERMINE CONDITIONAL PROBABILITY OF CANDIDATE WORD IN DISCOURSE INPUT GIVEN ONE OR MORE WORDS IN DISCOURSE INPUT — 406

DETERMINE PROBABILITY OF CANDIDATE WORD WITHIN CORPUS — 408

DETERMINE CONDITIONAL PROBABILITY OF CANDIDATE WORD GIVEN ONE OR MORE CLASSES ASSOCIATED WITH ONE OR MORE WORDS IN DISCOURSE INPUT — 410

DETERMINE INTEGRATED PROBABILITY OF CANDIDATE WORD AND ONE OR MORE SUBCLASSES ASSOCIATED WITH CANDIDATE WORD — 412

GENERATE OUTPUT ASSOCIATED WITH TEXT STRING — 414

(56) References Cited

U.S. PATENT DOCUMENTS 4,736,296 A 4/1988 Katayama et al.
4,750,122 A 6/1988 Kaji et al.
4,785,413 A 11/1988 Atsumi
4,797,930 A 1/1989 Goudie
4,802,223 A 1/1989 Lin et al.
4,803,729 A 2/1989 Baker
4,831,551 A 5/1989 Schalk et al.
4,875,187 A 10/1989 Smith
4,887,212 A 12/1989 Zamora et al.
4,908,867 A 3/1990 Silverman
4,918,723 A 4/1990 Iggulden et al.
4,945,504 A 7/1990 Nakama et al.
4,953,106 A 8/1990 Gansner et al.
4,980,916 A 12/1990 Zinser
4,985,924 A 1/1991 Matsuura
4,994,966 A 2/1991 Hutchins
5,007,095 A 4/1991 Nara et al.
5,027,408 A 6/1991 Kroeker et al.
5,029,211 A 7/1991 Ozawa
5,054,084 A 10/1991 Tanaka et al.
5,083,268 A 1/1992 Hemphill et al.
5,090,012 A 2/1992 Kajiyama et al.
5,091,790 A 2/1992 Silverberg
5,103,498 A 4/1992 Lanier et al.
5,109,509 A 4/1992 Katayama et al.
5,123,103 A 6/1992 Ohtaki et al.
5,125,030 A 6/1992 Nomura et al.
5,133,023 A 7/1992 Bokser
5,153,913 A 10/1992 Kandefer et al.
5,157,610 A 10/1992 Asano et al.
5,175,814 A 12/1992 Anick et al.
5,195,167 A 3/1993 Bahl et al.
5,212,638 A 5/1993 Bernath
5,220,629 A 6/1993 Kosaka et al.
5,237,502 A 8/1993 White et al.
5,278,980 A 1/1994 Pedersen et al.
5,325,462 A 6/1994 Farrett
5,327,342 A 7/1994 Roy
5,329,608 A 7/1994 Bocchieri et al.
5,353,374 A 10/1994 Wilson et al.
5,353,408 A 10/1994 Kato et al.
5,357,431 A 10/1994 Nakada et al.
5,369,575 A 11/1994 Lamberti et al.
5,369,577 A 11/1994 Kadashevich et al.
5,384,671 A 1/1995 Fisher
5,390,281 A 2/1995 Luciw et al.
5,392,419 A 2/1995 Walton
5,442,780 A 8/1995 Takanashi et al.
5,450,523 A 9/1995 Zhao
5,463,696 A 10/1995 Beernink et al.
5,473,728 A 12/1995 Luginbuhl et al.
5,477,447 A 12/1995 Luciw et al.
5,477,451 A 12/1995 Brown et al.
5,488,727 A 1/1996 Agrawal et al.
5,490,234 A 2/1996 Narayan
5,500,937 A 3/1996 Thompson-Rohrlich
5,548,507 A 8/1996 Martino et al.
5,610,812 A 3/1997 Schabes et al.
5,634,084 A 5/1997 Malsheen et al.
5,636,325 A 6/1997 Farrett
5,652,828 A 7/1997 Silverman
5,689,618 A 11/1997 Gasper et al.
5,732,395 A 3/1998 Silverman
5,737,487 A 4/1998 Bellegarda et al.
5,749,071 A 5/1998 Silverman
5,751,906 A 5/1998 Silverman
5,761,640 A 6/1998 Kalyanswamy et al.
5,765,131 A 6/1998 Stentiford et al.
5,832,433 A 11/1998 Yashchin et al.
5,832,435 A 11/1998 Silverman
5,850,480 A 12/1998 Scanlon
5,850,629 A 12/1998 Holm et al.
5,854,893 A 12/1998 Ludwig et al.
5,860,075 A 1/1999 Hashizume et al.
5,864,855 A 1/1999 Ruocco et al.
5,875,427 A 2/1999 Yamazaki
5,878,393 A 3/1999 Hata et al.
5,878,394 A 3/1999 Muhling
5,878,396 A 3/1999 Henton
5,890,117 A 3/1999 Silverman
5,915,238 A 6/1999 Tjaden
5,924,068 A 7/1999 Richard et al.
5,926,789 A 7/1999 Barbara et al.
5,949,961 A 9/1999 Sharman
5,999,927 A 12/1999 Tukey et al.
6,069,648 A 5/2000 Suso et al.
6,070,138 A 5/2000 Iwata
6,076,060 A 6/2000 Lin et al.
6,081,780 A 6/2000 Lumelsky
6,101,470 A 8/2000 Eide et al.
6,141,642 A 10/2000 Oh
6,141,644 A 10/2000 Kuhn et al.
6,161,087 A 12/2000 Wightman et al.
6,163,769 A 12/2000 Acero et al.
6,167,369 A 12/2000 Schulze
6,173,263 B1 1/2001 Conkie
6,182,028 B1 1/2001 Karaali et al.
6,185,533 B1 2/2001 Holm et al.
6,216,102 B1 4/2001 Martino et al.
6,226,614 B1 5/2001 Mizuno et al.
6,240,303 B1 5/2001 Katzur
6,243,681 B1 6/2001 Guji et al.
6,272,456 B1 8/2001 De Campos
6,278,970 B1 8/2001 Milner
6,289,301 B1 9/2001 Higginbotham et al.
6,292,772 B1 9/2001 Kantrowitz
6,343,267 B1 1/2002 Kuhn et al.
6,374,217 B1 4/2002 Bellegarda
6,377,925 B1 4/2002 Greene, Jr. et al.
6,385,586 B1 5/2002 Dietz
6,397,183 B1 5/2002 Baba et al.
6,405,169 B1 6/2002 Kondo et al.
6,411,932 B1 6/2002 Molnar et al.
6,415,250 B1 7/2002 Van Den Akker
6,424,944 B1 7/2002 Hikawa
6,434,604 B1 8/2002 Harada et al.
6,460,015 B1 10/2002 Hetherington et al.
6,477,494 B2 11/2002 Hyde-Thomson et al.
6,487,533 B2 11/2002 Hyde-Thomson et al.
6,490,560 B1 12/2002 Ramaswamy et al.
6,493,667 B1 12/2002 De Souza et al.
6,499,014 B1 12/2002 Chihara
6,598,054 B2 7/2003 Schuetze et al.
6,671,683 B2 12/2003 Kanno
6,694,297 B2 2/2004 Sato
6,701,318 B2 3/2004 Fox et al.
6,704,698 B1 3/2004 Paulsen, Jr. et al.
6,708,153 B2 3/2004 Brittan et al.
6,724,370 B2 4/2004 Dutta et al.
6,732,142 B1 5/2004 Bates et al.
6,757,653 B2 6/2004 Buth et al.
6,760,700 B2 7/2004 Lewis et al.
6,766,294 B2 7/2004 MacGinite et al.
6,789,231 B1 9/2004 Reynar et al.
6,794,566 B2 9/2004 Pachet
6,804,649 B2 10/2004 Miranda
6,813,607 B1 11/2004 Faruquie et al.
6,820,055 B2 11/2004 Saindon et al.
6,850,775 B1 2/2005 Berg
6,895,257 B2 5/2005 Boman et al.
6,925,438 B2 8/2005 Mohamed et al.
6,954,899 B1 10/2005 Anderson
6,970,820 B2 11/2005 Junqua et al.
6,996,575 B2 2/2006 Cox et al.
6,999,925 B2 2/2006 Fischer et al.
7,031,909 B2 4/2006 Mao et al.
7,035,801 B2 4/2006 Jimenez-Feltstrom
7,039,588 B2 5/2006 Okutani et al.
7,062,223 B2 6/2006 Gerber et al.
7,065,485 B1 6/2006 Chong-White et al.
7,072,686 B1 7/2006 Schrager
7,076,527 B2 7/2006 Bellegarda et al.
7,096,183 B2 8/2006 Junqua
7,103,548 B2 9/2006 Squibbs et al.

(56) References Cited

U.S. PATENT DOCUMENTS 7,117,231 B2 10/2006 Fischer et al.
7,124,081 B1 10/2006 Bellegarda
7,124,082 B2 10/2006 Freedman
7,127,396 B2 10/2006 Chu et al.
7,136,818 B1 11/2006 Cosatto et al.
7,139,697 B2 11/2006 Hakkinen et al.
7,143,038 B2 11/2006 Katae
7,149,695 B1 12/2006 Bellegarda
7,159,174 B2 1/2007 Johnson et al.
7,162,482 B1 1/2007 Dunning
7,181,388 B2 2/2007 Tian
7,185,276 B2 2/2007 Keswa
7,188,085 B2 3/2007 Pelletier
7,194,471 B1 3/2007 Nagatsuka et al.
7,200,550 B2 4/2007 Menezes et al.
7,236,932 B1 6/2007 Grajski
7,251,454 B2 7/2007 White
7,254,773 B2 8/2007 Bates et al.
7,263,373 B2 8/2007 Mattisson
7,266,189 B1 9/2007 Day
7,266,499 B2 9/2007 Surace et al.
7,269,544 B2 9/2007 Simske
7,275,063 B2 9/2007 Horn
7,277,088 B2 10/2007 Robinson et al.
7,277,855 B1 10/2007 Acker et al.
7,280,958 B2 10/2007 Pavlov et al.
7,283,072 B1 10/2007 Plachta et al.
7,292,979 B2 11/2007 Karas et al.
7,308,408 B1 12/2007 Stifelman et al.
7,310,329 B2 12/2007 Vieri et al.
7,310,605 B2 12/2007 Janakiraman et al.
7,313,523 B1 12/2007 Bellegarda et al.
7,321,783 B2 1/2008 Kim
7,324,833 B2 1/2008 White et al.
7,328,155 B2 2/2008 Endo et al.
7,353,139 B1 4/2008 Burrell et al.
7,359,493 B1 4/2008 Wang et al.
7,359,671 B2 4/2008 Richenstein et al.
7,359,851 B2 4/2008 Tong et al.
7,363,227 B2 4/2008 Mapes-Riordan et al.
7,365,260 B2 4/2008 Kawashima
7,366,461 B1 4/2008 Brown
7,373,612 B2 5/2008 Risch et al.
7,378,963 B1 5/2008 Begault et al.
7,383,170 B2 6/2008 Mills et al.
7,386,799 B1 6/2008 Clanton et al.
7,389,225 B1 6/2008 Jensen et al.
7,394,947 B2 7/2008 Li et al.
7,401,300 B2 7/2008 Nurmi
7,404,143 B2 7/2008 Freelander et al.
7,409,347 B1 8/2008 Bellegarda
7,412,470 B2 8/2008 Masuno et al.
7,418,389 B2 8/2008 Chu et al.
7,428,541 B2 9/2008 Houle
7,433,869 B2 10/2008 Gollapudi
7,433,921 B2 10/2008 Ludwig et al.
7,441,184 B2 10/2008 Frerebeau et al.
7,443,316 B2 10/2008 Lim
7,467,164 B2 12/2008 Marsh
7,472,061 B1 12/2008 Alewine et al.
7,472,065 B2 12/2008 Aaron et al.
7,475,063 B2 1/2009 Datta et al.
7,477,238 B2 1/2009 Fux et al.
7,477,240 B2 1/2009 Yanagisawa
7,478,091 B2 1/2009 Mojsilovic et al.
7,478,129 B1 1/2009 Chemtob
7,487,093 B2 2/2009 Mutsuno et al.
7,490,034 B2 2/2009 Finnigan et al.
7,499,923 B2 3/2009 Kawatani
7,505,795 B1 3/2009 Lim et al.
7,508,324 B2 3/2009 Suraqui
7,516,123 B2 4/2009 Betz et al.
7,519,327 B2 4/2009 White
7,523,036 B2 4/2009 Akabane et al.
7,535,997 B1 5/2009 McQuaide, Jr. et al.
7,536,029 B2 5/2009 Choi et al.
7,538,685 B1 5/2009 Cooper et al.
7,539,619 B1 5/2009 Seligman et al.
7,541,940 B2 6/2009 Upton
7,542,967 B2 6/2009 Hurst-Hiller et al.
7,552,045 B2 6/2009 Barliga et al.
7,555,496 B1 6/2009 Lantrip et al.
7,558,381 B1 7/2009 Ali et al.
7,562,007 B2 7/2009 Hwang
7,565,104 B1 7/2009 Brown et al.
7,565,380 B1 7/2009 Venkatachary
7,580,839 B2 8/2009 Tamura et al.
7,584,093 B2 9/2009 Potter et al.
7,593,868 B2 9/2009 Margiloff et al.
7,596,499 B2 9/2009 Anguera et al.
7,609,179 B2 10/2009 Diaz-Gutierrez et al.
7,620,407 B1 11/2009 Donald et al.
7,643,990 B1 1/2010 Bellegarda
7,649,877 B2 1/2010 Vieri et al.
7,656,393 B2 2/2010 King et al.
7,669,134 B1 2/2010 Christie et al.
7,672,952 B2 3/2010 Isaacson et al.
7,673,340 B1 3/2010 Cohen et al.
7,676,365 B2 3/2010 Hwang et al.
7,676,463 B2 3/2010 Thompson et al.
7,679,534 B2 3/2010 Kay et al.
7,680,649 B2 3/2010 Park
7,681,126 B2 3/2010 Roose
7,683,886 B2 3/2010 Willey
7,684,991 B2 3/2010 Stohr et al.
7,689,408 B2 3/2010 Chen et al.
7,689,409 B2 3/2010 Heinecke
7,689,421 B2 3/2010 Li et al.
7,693,717 B2 4/2010 Kahn et al.
7,706,510 B2 4/2010 Ng
7,707,026 B2 4/2010 Liu
7,707,221 B1 4/2010 Dunning et al.
7,710,262 B2 5/2010 Ruha
7,712,053 B2 5/2010 Bradford et al.
7,725,838 B2 5/2010 Williams
7,743,188 B2 6/2010 Haitani et al.
7,757,182 B2 7/2010 Elliott et al.
7,763,842 B2 7/2010 Hsu et al.
7,774,388 B1 8/2010 Runchey
7,778,432 B2 8/2010 Larsen
7,778,595 B2 8/2010 White et al.
7,779,353 B2 8/2010 Grigoriu et al.
7,783,283 B2 8/2010 Kuusinen et al.
7,797,265 B2 9/2010 Brinker et al.
7,797,269 B2 9/2010 Rieman et al.
7,801,721 B2 9/2010 Rosart et al.
7,801,728 B2 9/2010 Ben-David et al.
7,809,565 B2 10/2010 Coifman
7,809,569 B2 10/2010 Attwater et al.
7,809,744 B2 10/2010 Nevidomski et al.
7,818,165 B2 10/2010 Carlgren et al.
7,831,423 B2 11/2010 Schubert
7,831,432 B2 11/2010 Bodin et al.
7,840,581 B2 11/2010 Ross et al.
7,848,924 B2 12/2010 Nurminen et al.
7,853,445 B2 12/2010 Bachenko et al.
7,853,577 B2 12/2010 Sundaresan et al.
7,869,999 B2 1/2011 Amato et al.
7,870,118 B2 1/2011 Jiang et al.
7,877,705 B2 1/2011 Chambers et al.
7,880,730 B2 2/2011 Robinson et al.
7,890,330 B2 2/2011 Ozkaragoz et al.
7,908,287 B1 3/2011 Katragadda
7,925,525 B2 4/2011 Chin
7,929,805 B2 4/2011 Wang et al.
7,930,168 B2 4/2011 Weng et al.
7,930,183 B2 4/2011 Odell et al.
7,941,009 B2 5/2011 Li et al.
7,949,529 B2 5/2011 Weider et al.
7,949,534 B2 5/2011 Davis et al.
7,953,679 B2 5/2011 Chidlovskii et al.
7,962,179 B2 6/2011 Huang
7,974,844 B2 7/2011 Sumita
7,974,972 B2 7/2011 Cao

(56) References Cited

U.S. PATENT DOCUMENTS

| | | | |
|---|---|---|---|
| 7,983,915 | B2 | 7/2011 | Knight et al. |
| 7,983,917 | B2 | 7/2011 | Kennewick et al. |
| 7,983,919 | B2 | 7/2011 | Conkie |
| 7,983,997 | B2 | 7/2011 | Allen et al. |
| 7,984,062 | B2 | 7/2011 | Dunning et al. |
| 7,986,431 | B2 | 7/2011 | Emori et al. |
| 7,987,151 | B2 | 7/2011 | Schott et al. |
| 7,987,244 | B1 | 7/2011 | Lewis et al. |
| 7,996,228 | B2 | 8/2011 | Miller et al. |
| 7,999,669 | B2 | 8/2011 | Singh et al. |
| 8,000,453 | B2 | 8/2011 | Cooper et al. |
| 8,005,679 | B2 | 8/2011 | Jordan et al. |
| 8,006,180 | B2 | 8/2011 | Tunning et al. |
| 8,015,006 | B2 | 9/2011 | Kennewick et al. |
| 8,015,011 | B2 | 9/2011 | Nagano et al. |
| 8,019,271 | B1 | 9/2011 | Izdepski |
| 8,024,195 | B2 | 9/2011 | Mozer et al. |
| 8,027,836 | B2 | 9/2011 | Baker et al. |
| 8,036,901 | B2 | 10/2011 | Mozer |
| 8,037,034 | B2 | 10/2011 | Plachta et al. |
| 8,041,557 | B2 | 10/2011 | Liu |
| 8,041,570 | B2 | 10/2011 | Mirkovic et al. |
| 8,041,611 | B2 | 10/2011 | Kleinrock et al. |
| 8,046,363 | B2 | 10/2011 | Cha et al. |
| 8,055,708 | B2 | 11/2011 | Chitsaz et al. |
| 8,065,155 | B1 | 11/2011 | Gazdzinski |
| 8,065,156 | B2 | 11/2011 | Gazdzinski |
| 8,069,046 | B2 | 11/2011 | Kennewick et al. |
| 8,073,681 | B2 | 12/2011 | Baldwin et al. |
| 8,078,473 | B1 | 12/2011 | Gazdzinski |
| 8,082,153 | B2 | 12/2011 | Coffman et al. |
| 8,082,498 | B2 | 12/2011 | Salamon et al. |
| 8,090,571 | B2 | 1/2012 | Elshishiny et al. |
| 8,095,364 | B2 | 1/2012 | Longe et al. |
| 8,099,289 | B2 | 1/2012 | Mozer et al. |
| 8,099,418 | B2 | 1/2012 | Inoue et al. |
| 8,107,401 | B2 | 1/2012 | John et al. |
| 8,112,275 | B2 | 2/2012 | Kennewick et al. |
| 8,112,280 | B2 | 2/2012 | Lu |
| 8,117,037 | B2 | 2/2012 | Gazdzinski |
| 8,131,557 | B2 | 3/2012 | Davis et al. |
| 8,135,115 | B1 | 3/2012 | Hogg, Jr. et al. |
| 8,138,912 | B2 | 3/2012 | Singh et al. |
| 8,140,335 | B2 | 3/2012 | Kennewick et al. |
| 8,140,567 | B2 | 3/2012 | Padovitz et al. |
| 8,156,005 | B2 | 4/2012 | Vieri |
| 8,165,321 | B2 | 4/2012 | Paquier et al. |
| 8,165,886 | B1 | 4/2012 | Gagnon et al. |
| 8,166,019 | B1 | 4/2012 | Lee et al. |
| 8,188,856 | B2 | 5/2012 | Singh et al. |
| 8,190,359 | B2 | 5/2012 | Bourne |
| 8,195,467 | B2 | 6/2012 | Mozer et al. |
| 8,204,238 | B2 | 6/2012 | Mozer |
| 8,205,788 | B1 | 6/2012 | Gazdzinski et al. |
| 8,219,407 | B1 | 7/2012 | Roy et al. |
| 8,255,217 | B2 | 8/2012 | Stent et al. |
| 8,275,621 | B2 | 9/2012 | Alewine et al. |
| 8,285,546 | B2 | 10/2012 | Reich |
| 8,285,551 | B2 | 10/2012 | Gazdzinski |
| 8,285,553 | B2 | 10/2012 | Gazdzinski |
| 8,290,778 | B2 | 10/2012 | Gazdzinski |
| 8,290,781 | B2 | 10/2012 | Gazdzinski |
| 8,296,146 | B2 | 10/2012 | Gazdzinski |
| 8,296,153 | B2 | 10/2012 | Gazdzinski |
| 8,301,456 | B2 | 10/2012 | Gazdzinski |
| 8,311,834 | B1 | 11/2012 | Gazdzinski |
| 8,345,665 | B2 | 1/2013 | Vieri et al. |
| 8,352,268 | B2 | 1/2013 | Naik et al. |
| 8,352,272 | B2 | 1/2013 | Rogers et al. |
| 8,355,919 | B2 | 1/2013 | Silverman et al. |
| 8,359,234 | B2 | 1/2013 | Vieri |
| 8,370,158 | B2 | 2/2013 | Gazdzinski |
| 8,371,503 | B2 | 2/2013 | Gazdzinski |
| 8,374,871 | B2 | 2/2013 | Ehsani et al. |
| 8,380,504 | B1 | 2/2013 | Peden et al. |
| 8,381,107 | B2 | 2/2013 | Rottler et al. |
| 8,396,714 | B2 | 3/2013 | Rogers et al. |
| 8,428,758 | B2 | 4/2013 | Naik et al. |
| 8,447,612 | B2 | 5/2013 | Gazdzinski |
| 8,521,513 | B2 | 8/2013 | Millett et al. |
| 8,595,004 | B2 | 11/2013 | Koshinaka |
| 8,660,849 | B2 | 2/2014 | Gruber et al. |
| 8,660,970 | B1 | 2/2014 | Fiedorowicz |
| 2001/0032080 | A1 | 10/2001 | Fukada |
| 2001/0044724 | A1 | 11/2001 | Hon et al. |
| 2001/0056342 | A1 | 12/2001 | Piehn et al. |
| 2002/0001395 | A1 | 1/2002 | Davis et al. |
| 2002/0026315 | A1 | 2/2002 | Miranda |
| 2002/0040359 | A1 | 4/2002 | Green et al. |
| 2002/0059066 | A1 | 5/2002 | O'hagan |
| 2002/0091511 | A1 | 7/2002 | Hellwig et al. |
| 2002/0103646 | A1 | 8/2002 | Kochanski et al. |
| 2002/0120925 | A1 | 8/2002 | Logan |
| 2002/0123894 | A1 | 9/2002 | Woodward |
| 2002/0128840 | A1 | 9/2002 | Hinde et al. |
| 2002/0138270 | A1 | 9/2002 | Bellegarda et al. |
| 2002/0193996 | A1 | 12/2002 | Squibbs et al. |
| 2002/0198715 | A1 | 12/2002 | Belrose |
| 2003/0037073 | A1 | 2/2003 | Tokuda et al. |
| 2003/0149557 | A1 | 8/2003 | Cox et al. |
| 2003/0154081 | A1 | 8/2003 | Chu et al. |
| 2003/0158735 | A1 | 8/2003 | Yamada et al. |
| 2003/0163316 | A1 | 8/2003 | Addison et al. |
| 2003/0191645 | A1 | 10/2003 | Zhou |
| 2004/0006467 | A1 | 1/2004 | Anisimovich et al. |
| 2004/0054534 | A1 | 3/2004 | Junqua |
| 2004/0054541 | A1 | 3/2004 | Kryze et al. |
| 2004/0073428 | A1 | 4/2004 | Zlokarnik et al. |
| 2004/0106432 | A1 | 6/2004 | Kanamori et al. |
| 2004/0111266 | A1 | 6/2004 | Coorman et al. |
| 2004/0124583 | A1 | 7/2004 | Landis |
| 2004/0138869 | A1 | 7/2004 | Heinecke |
| 2004/0177319 | A1 | 9/2004 | Horn |
| 2004/0193398 | A1 | 9/2004 | Chu et al. |
| 2004/0193421 | A1 | 9/2004 | Blass |
| 2004/0249667 | A1 | 12/2004 | Oon |
| 2004/0252604 | A1 | 12/2004 | Johnson et al. |
| 2005/0027385 | A1 | 2/2005 | Yueh |
| 2005/0060155 | A1 | 3/2005 | Chu et al. |
| 2005/0080613 | A1 | 4/2005 | Colledge et al. |
| 2005/0102144 | A1 | 5/2005 | Rapoport |
| 2005/0108344 | A1 | 5/2005 | Tafoya et al. |
| 2005/0144003 | A1 | 6/2005 | Iso-Sipila |
| 2005/0149330 | A1 | 7/2005 | Katae |
| 2005/0154578 | A1 | 7/2005 | Tong et al. |
| 2005/0182630 | A1 | 8/2005 | Miro et al. |
| 2005/0187773 | A1 | 8/2005 | Filoche et al. |
| 2005/0222973 | A1 | 10/2005 | Kaiser |
| 2005/0246350 | A1 | 11/2005 | Canaran |
| 2006/0041424 | A1 | 2/2006 | Todhunter et al. |
| 2006/0041431 | A1 | 2/2006 | Maes |
| 2006/0085187 | A1 | 4/2006 | Barquilla |
| 2006/0085465 | A1 | 4/2006 | Nori et al. |
| 2006/0095265 | A1 | 5/2006 | Chu et al. |
| 2006/0100848 | A1 | 5/2006 | Cozzi et al. |
| 2006/0168150 | A1 | 7/2006 | Naik et al. |
| 2006/0168507 | A1 | 7/2006 | Hansen |
| 2006/0205432 | A1 | 9/2006 | Hawkins et al. |
| 2006/0212415 | A1 | 9/2006 | Backer et al. |
| 2006/0240866 | A1 | 10/2006 | Eilts et al. |
| 2006/0246955 | A1 | 11/2006 | Nirhamo et al. |
| 2006/0252457 | A1 | 11/2006 | Schrager |
| 2006/0282415 | A1 | 12/2006 | Shibata et al. |
| 2007/0016865 | A1 | 1/2007 | Johnson et al. |
| 2007/0025704 | A1 | 2/2007 | Tsukazaki et al. |
| 2007/0050184 | A1 | 3/2007 | Drucker et al. |
| 2007/0055493 | A1 | 3/2007 | Lee |
| 2007/0073541 | A1 | 3/2007 | Tian |
| 2007/0098195 | A1 | 5/2007 | Holmes |
| 2007/0100602 | A1 | 5/2007 | Kim |
| 2007/0155346 | A1 | 7/2007 | Mijatovic et al. |
| 2007/0156410 | A1 | 7/2007 | Stohr et al. |
| 2007/0162414 | A1 | 7/2007 | Horowitz et al. |
| 2007/0192105 | A1 | 8/2007 | Neeracher et al. |

(56) References Cited

U.S. PATENT DOCUMENTS

2007/0192293 A1 8/2007 Swen
2007/0192403 A1 8/2007 Heine et al.
2007/0192744 A1 8/2007 Reponen
2007/0198273 A1 8/2007 Hennecke
2007/0198566 A1 8/2007 Sustik
2007/0207785 A1 9/2007 Chatterjee et al.
2007/0213099 A1 9/2007 Bast
2007/0213857 A1 9/2007 Bodin et al.
2007/0219777 A1 9/2007 Chu et al.
2007/0219803 A1 9/2007 Chiu et al.
2007/0225984 A1 9/2007 Milstein et al.
2007/0226652 A1 9/2007 Kikuchi et al.
2007/0229323 A1 10/2007 Plachta et al.
2007/0233490 A1 10/2007 Yao
2007/0238520 A1 10/2007 Kacmarcik
2007/0244702 A1 10/2007 Kahn et al.
2007/0255435 A1 11/2007 Cohen et al.
2007/0255979 A1 11/2007 Deily et al.
2007/0260460 A1 11/2007 Hyatt
2007/0260595 A1 11/2007 Beatty et al.
2007/0260822 A1 11/2007 Adams
2007/0261080 A1 11/2007 Saetti
2007/0271510 A1 11/2007 Grigoriu et al.
2007/0274468 A1 11/2007 Cai
2007/0285958 A1 12/2007 Platchta et al.
2007/0286363 A1 12/2007 Burg et al.
2007/0288449 A1 12/2007 Datta et al.
2007/0294077 A1 12/2007 Narayanan et al.
2008/0010355 A1 1/2008 Vieri et al.
2008/0013751 A1 1/2008 Hiselius
2008/0016575 A1 1/2008 Vincent et al.
2008/0022208 A1 1/2008 Morse
2008/0031475 A1 2/2008 Goldstein
2008/0034044 A1 2/2008 Bhakta et al.
2008/0043936 A1 2/2008 Liebermann
2008/0043943 A1 2/2008 Sipher et al.
2008/0046239 A1 2/2008 Boo
2008/0046422 A1 2/2008 Lee et al.
2008/0046948 A1 2/2008 Verosub
2008/0052077 A1 2/2008 Bennett et al.
2008/0056459 A1 3/2008 Vallier et al.
2008/0059190 A1 3/2008 Chu et al.
2008/0059200 A1 3/2008 Puli
2008/0059876 A1 3/2008 Hantler et al.
2008/0065382 A1 3/2008 Gerl et al.
2008/0071529 A1 3/2008 Silverman et al.
2008/0077393 A1 3/2008 Gao et al.
2008/0077859 A1 3/2008 Schabes et al.
2008/0082576 A1 4/2008 Bodin et al.
2008/0091426 A1 4/2008 Rempel et al.
2008/0091443 A1 4/2008 Strope et al.
2008/0096726 A1 4/2008 Riley et al.
2008/0097937 A1 4/2008 Hadjarian
2008/0098302 A1 4/2008 Roose
2008/0100579 A1 5/2008 Robinson et al.
2008/0114480 A1 5/2008 Harb
2008/0114598 A1 5/2008 Prieto et al.
2008/0114841 A1 5/2008 Lambert
2008/0130867 A1 6/2008 Bowen
2008/0133241 A1 6/2008 Baker et al.
2008/0141180 A1 6/2008 Reed et al.
2008/0146290 A1 6/2008 Sreeram et al.
2008/0147408 A1 6/2008 Da Palma et al.
2008/0147411 A1 6/2008 Dames et al.
2008/0163131 A1 7/2008 Hirai et al.
2008/0165144 A1 7/2008 Forstall et al.
2008/0165994 A1 7/2008 Caren et al.
2008/0167013 A1 7/2008 Novick et al.
2008/0167858 A1 7/2008 Christie et al.
2008/0168366 A1 7/2008 Kocienda et al.
2008/0183473 A1 7/2008 Nagano et al.
2008/0189099 A1 8/2008 Friedman et al.
2008/0189606 A1 8/2008 Rybak
2008/0195601 A1 8/2008 Ntoulas et al.
2008/0195940 A1 8/2008 Gail et al.
2008/0201375 A1 8/2008 Khedouri et al.
2008/0204379 A1 8/2008 Perez-Noguera
2008/0207176 A1 8/2008 Brackbill et al.
2008/0212796 A1 9/2008 Denda
2008/0222118 A1 9/2008 Scian et al.
2008/0228485 A1 9/2008 Owen
2008/0228928 A1 9/2008 Donelli et al.
2008/0229185 A1 9/2008 Lynch
2008/0235024 A1 9/2008 Goldberg et al.
2008/0242280 A1 10/2008 Shapiro et al.
2008/0244390 A1 10/2008 Fux et al.
2008/0248797 A1 10/2008 Freeman et al.
2008/0259022 A1 10/2008 Mansfield et al.
2008/0262838 A1 10/2008 Nurminen et al.
2008/0262846 A1 10/2008 Burns et al.
2008/0270138 A1 10/2008 Knight et al.
2008/0270139 A1 10/2008 Shi et al.
2008/0270140 A1 10/2008 Hertz et al.
2008/0292112 A1 11/2008 Valenzuela et al.
2008/0294651 A1 11/2008 Masuyama et al.
2008/0298766 A1 12/2008 Wen et al.
2008/0300871 A1 12/2008 Gilbert
2008/0306727 A1 12/2008 Thurmair et al.
2008/0312909 A1 12/2008 Hermansen et al.
2008/0319738 A1* 12/2008 Liu ...................... G06F 17/277 704/10
2008/0319753 A1 12/2008 Hancock
2009/0005012 A1 1/2009 Van Heugten
2009/0006097 A1 1/2009 Etezadi et al.
2009/0007001 A1 1/2009 Morin et al.
2009/0012748 A1 1/2009 Beish et al.
2009/0018828 A1 1/2009 Nakadai et al.
2009/0018840 A1 1/2009 Lutz et al.
2009/0030978 A1 1/2009 Johnson et al.
2009/0043583 A1 2/2009 Agapi et al.
2009/0048821 A1 2/2009 Yam et al.
2009/0049067 A1 2/2009 Murray
2009/0055186 A1 2/2009 Lance et al.
2009/0063974 A1 3/2009 Bull et al.
2009/0064031 A1 3/2009 Bull et al.
2009/0070102 A1 3/2009 Maegawa
2009/0070114 A1 3/2009 Staszak
2009/0074214 A1 3/2009 Bradford et al.
2009/0076819 A1 3/2009 Wouters et al.
2009/0076821 A1 3/2009 Brenner et al.
2009/0076825 A1 3/2009 Bradford et al.
2009/0083035 A1 3/2009 Huang et al.
2009/0083036 A1 3/2009 Zhao et al.
2009/0083037 A1 3/2009 Gleason et al.
2009/0094029 A1 4/2009 Koch et al.
2009/0100454 A1 4/2009 Weber
2009/0106376 A1 4/2009 Tom et al.
2009/0106397 A1 4/2009 O'Keefe
2009/0123021 A1 5/2009 Jung et al.
2009/0137286 A1 5/2009 Luke et al.
2009/0138736 A1 5/2009 Chin
2009/0138828 A1 5/2009 Schultz et al.
2009/0144609 A1 6/2009 Liang et al.
2009/0150147 A1 6/2009 Jacoby et al.
2009/0157382 A1 6/2009 Bar
2009/0157384 A1 6/2009 Toutanova et al.
2009/0158423 A1 6/2009 Orlassino et al.
2009/0174667 A1 7/2009 Kocienda et al.
2009/0198497 A1 8/2009 Kwon
2009/0213134 A1 8/2009 Stephanick et al.
2009/0228281 A1 9/2009 Singleton et al.
2009/0240485 A1 9/2009 Dalal et al.
2009/0241760 A1 10/2009 Georges
2009/0247237 A1 10/2009 Mittleman et al.
2009/0249198 A1 10/2009 Davis et al.
2009/0254345 A1 10/2009 Fleizach et al.
2009/0271176 A1 10/2009 Bodin et al.
2009/0274315 A1 11/2009 Carnes et al.
2009/0281789 A1 11/2009 Waibel et al.
2009/0296552 A1 12/2009 Hicks et al.
2009/0300488 A1 12/2009 Salamon et al.
2009/0304198 A1 12/2009 Herre et al.
2009/0307201 A1 12/2009 Dunning et al.
2009/0313544 A1 12/2009 Wood et al.

(56) References Cited

U.S. PATENT DOCUMENTS

| | | | |
|---|---|---|---|
| 2009/0313564 | A1 | 12/2009 | Rottler et al. |
| 2009/0316943 | A1 | 12/2009 | Frigola Munoz et al. |
| 2009/0327977 | A1 | 12/2009 | Bachfischer et al. |
| 2010/0023318 | A1 | 1/2010 | Lemoine |
| 2010/0054512 | A1 | 3/2010 | Solum |
| 2010/0063804 | A1 | 3/2010 | Sato et al. |
| 2010/0063961 | A1 | 3/2010 | Guiheneuf et al. |
| 2010/0067723 | A1 | 3/2010 | Bergmann et al. |
| 2010/0080470 | A1 | 4/2010 | Deluca et al. |
| 2010/0103776 | A1 | 4/2010 | Chan |
| 2010/0164897 | A1 | 7/2010 | Morin et al. |
| 2010/0169075 | A1 | 7/2010 | Raffa et al. |
| 2010/0169097 | A1 | 7/2010 | Nachman et al. |
| 2010/0179991 | A1 | 7/2010 | Lorch et al. |
| 2010/0211199 | A1 | 8/2010 | Naik et al. |
| 2010/0250599 | A1 | 9/2010 | Schmidt et al. |
| 2010/0268539 | A1 | 10/2010 | Xu et al. |
| 2010/0281034 | A1 | 11/2010 | Petrou et al. |
| 2010/0302056 | A1 | 12/2010 | Dutton et al. |
| 2010/0305807 | A1 | 12/2010 | Basir et al. |
| 2010/0322438 | A1 | 12/2010 | Siotis |
| 2010/0325588 | A1 | 12/2010 | Reddy et al. |
| 2011/0002487 | A1 | 1/2011 | Panther et al. |
| 2011/0022292 | A1 | 1/2011 | Shen et al. |
| 2011/0033064 | A1 | 2/2011 | Johnson et al. |
| 2011/0038489 | A1 | 2/2011 | Visser et al. |
| 2011/0047161 | A1 | 2/2011 | Myaeng et al. |
| 2011/0083079 | A1 | 4/2011 | Farrell et al. |
| 2011/0087491 | A1 | 4/2011 | Wittenstein et al. |
| 2011/0093261 | A1 | 4/2011 | Angott |
| 2011/0106736 | A1 | 5/2011 | Aharonson et al. |
| 2011/0119051 | A1 | 5/2011 | Li et al. |
| 2011/0131038 | A1 | 6/2011 | Oyaizu et al. |
| 2011/0144973 | A1 | 6/2011 | Bocchieri et al. |
| 2011/0153324 | A1* | 6/2011 | Ballinger ................ G10L 15/30 704/235 |
| 2011/0179372 | A1 | 7/2011 | Moore et al. |
| 2011/0191271 | A1 | 8/2011 | Baker et al. |
| 2012/0053815 | A1 | 3/2012 | Montanari et al. |
| 2012/0082317 | A1 | 4/2012 | Pance et al. |

FOREIGN PATENT DOCUMENTS

| | | | |
|---|---|---|---|
| DE | 4334773 | A1 | 4/1994 |
| DE | 4445023 | A1 | 6/1996 |
| DE | 10-2004-029203 | A1 | 12/2005 |
| EP | 0030390 | A1 | 6/1981 |
| EP | 0057514 | A1 | 8/1982 |
| EP | 0283995 | A2 | 9/1988 |
| EP | 0464712 | A2 | 1/1992 |
| EP | 0476972 | A2 | 3/1992 |
| EP | 0575146 | A2 | 12/1993 |
| EP | 0578604 | A1 | 1/1994 |
| EP | 0586996 | A2 | 3/1994 |
| EP | 0609030 | A1 | 8/1994 |
| EP | 0651543 | A2 | 5/1995 |
| EP | 0679005 | A1 | 10/1995 |
| EP | 0795811 | A1 | 9/1997 |
| EP | 0476972 | B1 | 5/1998 |
| EP | 0845894 | A2 | 6/1998 |
| EP | 0863469 | A2 | 9/1998 |
| EP | 0867860 | A2 | 9/1998 |
| EP | 0869697 | A2 | 10/1998 |
| EP | 0917077 | A2 | 5/1999 |
| EP | 0946032 | A2 | 9/1999 |
| EP | 0982732 | A1 | 3/2000 |
| EP | 1347361 | A1 | 9/2003 |
| EP | 1379061 | A2 | 1/2004 |
| EP | 1432219 | A1 | 6/2004 |
| EP | 0651543 | B1 | 9/2008 |
| JP | 2001-56233 | A | 2/2001 |
| JP | 2005-221678 | A | 8/2005 |
| JP | 2005-311864 | A | 11/2005 |
| JP | 2006-146008 | A | 6/2006 |
| JP | 2009-98490 | A | 5/2009 |
| KR | 10-2006-0073574 | A | 6/2006 |
| KR | 10-2009-0001716 | A | 1/2009 |
| WO | 93/20640 | A1 | 10/1993 |
| WO | 94/29788 | A1 | 12/1994 |
| WO | 95/16950 | A1 | 6/1995 |
| WO | 97/29614 | A1 | 8/1997 |
| WO | 97/38488 | A1 | 10/1997 |
| WO | 98/09270 | A1 | 3/1998 |
| WO | 98/33111 | A1 | 7/1998 |
| WO | 99/16181 | A1 | 4/1999 |
| WO | 03/056789 | A1 | 7/2003 |
| WO | 03/067202 | A2 | 8/2003 |
| WO | 03/084196 | A1 | 10/2003 |
| WO | 2004/025938 | A1 | 3/2004 |
| WO | 2004/047415 | A1 | 6/2004 |
| WO | 2004/055637 | A2 | 7/2004 |
| WO | 2004/057486 | A1 | 7/2004 |
| WO | 2004/061850 | A1 | 7/2004 |
| WO | 2004/084413 | A2 | 9/2004 |
| WO | 2005/003920 | A2 | 1/2005 |
| WO | 2005/008505 | A1 | 1/2005 |
| WO | 2005/008899 | A1 | 1/2005 |
| WO | 2005/010725 | A2 | 2/2005 |
| WO | 2005/027472 | A2 | 3/2005 |
| WO | 2005/027485 | A1 | 3/2005 |
| WO | 2005/031737 | A1 | 4/2005 |
| WO | 2005/041455 | A1 | 5/2005 |
| WO | 2006/020305 | A2 | 2/2006 |
| WO | 2006/054724 | A1 | 5/2006 |
| WO | 2006/056822 | A1 | 6/2006 |
| WO | 2006/078246 | A1 | 7/2006 |
| WO | 2006/101649 | A2 | 9/2006 |
| WO | 2007/002753 | A2 | 1/2007 |
| WO | 2007/083894 | A1 | 7/2007 |
| WO | 2008/140236 | A1 | 11/2008 |
| WO | 2008/153639 | A1 | 12/2008 |
| WO | 2009/017280 | A1 | 2/2009 |
| WO | 2009/156438 | A1 | 12/2009 |
| WO | 2011/057346 | A1 | 5/2011 |
| WO | 2011/150730 | A1 | 12/2011 |

OTHER PUBLICATIONS

Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.

Gruber, Tom, "Collective Knowledge Systems: Where the Social Web Meets the Semantic Web", Web Semantics: Science, Services and Agents on the World Wide Web, 2007, pp. 1-19.

Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.

Gruber, Tom, "Enterprise Collaboration Management with Intraspect", Intraspect Technical White Paper, Jul. 2001, pp. 1-24.

Gruber, Tom, "Every Ontology is a Treaty—A Social Agreement-Among People with Some Common Motive in Sharing", Official Quarterly Bulletin of AIS Special Interest Group on Semantic Web and Information Systems, vol. 1, No. 3, 2004, pp. 1-5.

Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.

Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.

Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.

Gruber, Tom, "Ontologies, Web 2.0 and Beyond", Ontology Summit, Available online at <http://tomgruber.org/writing/ontolog-social-web-keynote.htm>, Apr. 2007, 17 pages.

(56) References Cited

OTHER PUBLICATIONS

Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant-Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semantic Web Conference, Nov. 2006, 38 pages.
Guida et al., "NLI: A Robust Interface for Natural Language Person-Machine Communication", International Journal of Man-Machine Studies, vol. 17, 1982, 17 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier >, 2006, 5 pages.
Guzzoni et al., "Active, A Tool for Building Intelligent User Interfaces", ASC 2007, Palma de Mallorca, Aug. 2007, 6 pages.
Guzzoni, D., "Active: A Unified Platform for Building Intelligent Assistant Applications", Oct. 25, 2007, 262 pages.
Guzzoni et al., "Many Robots Make Short Work", AAAI Robot Contest, SRI International, 1996, 9 pages.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Helm et al., "Building Visual Language Parsers", Proceedings of CHI'91, Proceedings of the SIGCHI Conference on Human Factors in Computing Systems, 1991, 8 pages.
Hendrix et al., "Developing a Natural Language Interface to Complex Data", ACM Transactions on Database Systems, vol. 3, No. 2, Jun. 1978, pp. 105-147.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Hendrix et al., "Transportable Natural-Language Interfaces to Databases", SRI International, Technical Note 228, Apr. 30, 1981, 18 pages.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.
Huang et al., "The SPHINX-II Speech Recognition System: An Overview", Computer, Speech and Language, vol. 7, No. 2, 1993, 14 pages.
IBM, "Speech Editor", IBM Technical Disclosure Bulletin, vol. 29, No. 10, Mar. 10, 1987, 3 pages.
Markel et al., "Linear Prediction of Speech", Springer-Verlag, Berlin, Heidelberg, New York, 1976, 12 pages.
Martin et al., "Building and Using Practical Agent Applications", SRI International, PAAM Tutorial, 1998, 78 pages.
Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the Second International Conference on the Practical Application of Intelligent Agents and Multi-Agent Technology, Apr. 1997, pp. 1-20.
Martin et al., "Transportability and Generality in a Natural-Language Interface System", Proceedings of the Eighth International Joint Conference on Artificial Intelligence, Technical Note 293, Aug. 1983, 21 pages.
Martin et al., "The Open Agent Architecture: A Framework for Building Distributed Software Systems", Applied Artificial Intelli-

(56) References Cited

OTHER PUBLICATIONS gence: An International Journal, vol. 13, No. 1-2, available at <http://adam.cheyer.com/papers/oaa.pdf>>, retrieved from internet on Jan.-Mar. 1999.
Matiasek et al., "Tamic-P: A System for NL Access to Social Insurance Database", 4th International Conference on Applications of Natural Language to Information Systems, Jun. 1999, 7 pages.
McGuire et al., "SHADE: Technology for Knowledge-Based Collaborative Engineering", Journal of Concurrent Engineering Applications and Research (CERA), 1993, 18 pages.
Meng et al., "Wheels: A Conversational System in the Automobile Classified Domain", Proceedings of Fourth International Conference on Spoken Language, ICSLP 96, vol. 1, Oct. 1996, 4 pages.
Michos et al., "Towards an Adaptive Natural Language Interface to Command Languages", Natural Language Engineering, vol. 2, No. 3, 1996, pp. 191-209.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Modi et al., "CMRadar: A Personal Assistant Agent for Calendar Management", AAAI, Intelligent Systems Demonstrations, 2004, pp. 1020-1021.
Moore et al., "Combining Linguistic and Statistical Knowledge Sources in Natural-Language Processing for ATIS", SRI International, Artificial Intelligence Center, 1995, 4 pages.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Nakagawa et al., "Speaker Recognition by Combining MFCC and Phase Information", IEEE International Conference on Acoustics, Speech and Signal Processing (ICASSP), Mar. 2010, 4 pages.
Naone, Erica, "TR10: Intelligent Software Assistant", Technology Review, Mar.-Apr. 2009, 2 pages.
Neches et al., "Enabling Technology for Knowledge Sharing", Fall, 1991, pp. 37-56.
Niesler et al., "A Variable-Length Category-Based N-Gram Language Model", IEEE International Conference on Acoustics, Speech and Signal Processing (ICASSP'96), vol. 1, May 1996, 6 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Odubiyi et al., "SAIRE—A Scalable Agent-Based Information Retrieval Engine", Proceedings of the First International Conference on Autonomous Agents, 1997, 12 pages.
Owei et al., "Natural Language Query Filtration in the Conceptual Query Language", IEEE, 1997, pp. 539-549.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.
Parsons, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.
International Preliminary Report on Patentability received for PCT Patent Application No. PCT/US1993/012637, issued on Apr. 10, 1995, 7 pages.
International Preliminary Report on Patentability received for PCT Patent Application No. PCT/US1993/012666, issued on Mar. 1, 1995, 5 pages.
International Search Report received for PCT Patent Application No. PCT/US1993/012666, mailed on Nov. 9, 1994, 8 pages.
International Preliminary Report on Patentability received for PCT Patent Application No. PCT/US1994/011011, issued on Feb. 28, 1996, 4 pages.
International Search Report received for PCT Patent Application No. PCT/US1994/011011, mailed on Feb. 8, 1995, 7 pages.
Written Opinion received for PCT Patent Application No. PCT/US1994/011011, mailed on Aug. 21, 1995, 4 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Casner et al., "N-Way Conferencing with Packet Video", The Third International Workshop on Packet Video, Mar. 22-23, 1990, pp. 1-6.
Chakarova et al., "Digital Still Cameras—Downloading Images to a Computer", Multimedia Reporting and Convergence, available at

(56) References Cited

OTHER PUBLICATIONS

<http://journalism.berkeley.edu/multimedia/tutorials/stillcams/downloading.html>, retrieved on May 9, 2005, 2 pages.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Extended European Search Report (includes European Search Report and European Search Opinion) received for European Patent Application No. 06256215.2, mailed on Feb. 20, 2007, 6 pages.
Extended European Search Report (includes Supplementary European Search Report and Search Opinion) received for European Patent Application No. 07863218.9, mailed on Dec. 9, 2010, 7 pages.
Extended European Search Report (includes European Search Report and European Search Opinion) received for European Patent Application No. 12186113.2, mailed on Apr. 28, 2014, 14 pages.
Extended European Search Report (includes European Search Report and European Search Opinion) received for European Patent Application No. 13155688.8, mailed on Aug. 22, 2013, 11 pages.
Abcom Pty. Ltd. "12.1" 925 Candela Mobile PC", LCDHardware.com, available at <http://www.lcdhardware.com/panel/12_1_panel/default.asp.>, retrieved on Dec. 19, 2002, 2 pages.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.
Coleman, David W., "Meridian Mail Voice Mail System Integrates Voice Processing and Personal Computing", Speech Technology, vol. 4, No. 2, Mar./Apr. 1988, pp. 84-87.
Compaq, "Personal Jukebox", available at <http://research.compaq.com/SRC/pjb/>, 2001, 3 pages.
Compaq Inspiration Technology, "Personal Jukebox (PJB)—Systems Research Center and PAAD", Oct. 13, 2000, 25 pages.
Conkie et al., "Preselection of Candidate Units in a Unit Selection-Based Text-to-Speech Synthesis System", ISCA, 2000, 4 pages.
Conklin, Jeffrey, "A Survey of Hypertext", MCC Software Technology Program, Dec. 1987, 40 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.
Creative, "Creative NOMAD MuVo TX", available at <http://web.archive.org/web/20041024175952/www.creative.com/products/pfriendly.asp?product=9672>, retrieved on Jun. 6, 2006, 1 page.
Creative, "Digital MP3 Player", available at <http://web.archive.org/web/20041024074823/www.creative. com/products/product.asp?category=213&subcategory=216&product=4983, 2004, 1 page.
Creative Technology Ltd., "Creative NOMAD®: Digital Audio Player: User Guide (On-Line Version)", available at <http://ec1.images-amazon.com/media/i3d/01/a/man-migrate/MANUAL000010757.pdf>, Jun. 1999, 40 pages.
Creative Technology Ltd., "Creative NOMAD® II: Getting Started—User Guide (On Line Version)", available at <http://ec1.images-amazon.com/media/i3d/01/a/man-migrate/MANUAL000026434.pdf>, Apr. 2000, 46 pages.
Creative Technology Ltd., "Nomad Jukebox", User Guide, Version 1.0, Aug. 2000, 52 pages.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
ABF Software, "Lens—Magnifying Glass 1.5", available at <http://download.com/3000-2437-10262078.html?tag=1st-0-1>, retrieved on Feb. 11, 2004, 1 page.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Degani et al., "'Soft' Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15, 2006, 14 pages.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Equipment Corporation, "OpenVMS RTL DECtalk (DTK$) Manual", May 1993, 56 pages.
Donahue et al., "Whiteboards: A Graphical Database Tool", ACM Transactions on Office Information Systems, vol. 4, No. 1, Jan. 1986, pp. 24-41.
Dourish et al., "Portholes: Supporting Awareness in a Distributed Work Group", CHI 1992;, May 1992, pp. 541-547.
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.
dyslexic.com, "AlphaSmart 3000 with CoWriter SmartApplet: Don Johnston Special Needs", available at <http://www.dyslexic.com/procuts.php?catid- 2&pid=465&PHPSESSID=2511b800000f7da>, retrieved on Dec. 6, 2005, 13 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.
Elofson et al., "Delegation Technologies: Environmental Scanning with Intelligent Agents", Jour. of Management Info. Systems, Summer 1991, vol. 8, No. 1, 1991, pp. 37-62.
Eluminx, "Illuminated Keyboard", available at <http://www.elumix.com/>, retrieved on Dec. 19, 2002, 1 page.
Engst, Adam C., "SoundJam Keeps on Jammin", available at <http://db.tidbits.com/getbits.acgi?tbart=05988>, Jun. 19, 2000, 3 pages.
Ericsson Inc., "Cellular Phone with Integrated MP3 Player", Research Disclosure Journal No. 41815, Feb. 1999, 2 pages.
Eslambolchilar et al., "Making Sense of Fisheye Views", Second Dynamics and Interaction Workshop at University of Glasgow, Aug. 2005, 6 pages.
Eslambolchilar et al., "Multimodal Feedback for Tilt Controlled Speed Dependent Automatic Zooming", UIST'04, Oct. 24-27, 2004, 2 pages.
Fanty et al., "A Comparison of DFT, PLP and Cochleagram for Alphabet Recognition", IEEE, Nov. 1991.

(56) References Cited

OTHER PUBLICATIONS

Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gaver et al., "One is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glinert-Stevens, Susan, "Microsoft Publisher: Desktop Wizardry", PC Sources, vol. 3, No. 2, Feb. 1992, 1 page.
Gmail, "About Group Chat", available at <http://mail.google.com/support/bin/answer.py?answer=81090>, Nov. 26, 2007, 2 pages.
Goldberg, Cheryl, "IBM Drawing Assistant: Graphics for the EGA", PC Magazine, vol. 4, No. 26, Dec. 24, 1985, 1 page.
Good et al., "Building a User-Derived Interface", Communications of the ACM; (Oct. 1984) vol. 27, No. 10, Oct. 1984, pp. 1032-1043.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Greenberg, Saul, "A Fisheye Text Editor for Relaxed-WYSIWIS Groupware", CHI '96 Companion, Vancouver, Canada, Apr. 13-18, 1996, 2 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Gruhn et al., "A Research Perspective on Computer-Assisted Office Work", IBM Systems Journal, vol. 18, No. 3, 1979, pp. 432-456.
Hain et al., "The Papageno TTS System", Siemens AG, Corporate Technology, Munich, Germany TC-STAR Workshop, 2006, 6 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hartson et al., "Advances in Human-Computer Interaction", Chapters 1, 5, and 6, vol. 3, 1992, 121 pages.
Heger et al., "KNOWBOT: An Adaptive Data Base Interface", Nuclear Science and Engineering, V. 107, No. 2, Feb. 1991, pp. 142-157.
Hendrix et al., "The Intelligent Assistant: Technical Considerations Involved in Designing Q&A's Natural-Language Interface", Byte Magazine, Issue 14, Dec. 1987, 1 page.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Holmes, "Speech System and Research", 1955, pp. 129-135, 152-153.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, 10 pages.
Hukin, R. W., "Testing an Auditory Model by Resynthesis", European Conference on Speech Communication and Technology, Sep. 26-29, 1989, pp. 243-246.
Hunt, "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
IBM, "Why Buy: ThinkPad", available at <http://www.pc.ibm.com/us/thinkpad/easeofuse.html>, retrieved on Dec. 19, 2002, 2 pages.
IBM Corporation, "Simon Says Here's How", Users Manual, 1994, 3 pages.
IChat AV, "Video Conferencing for the Rest of Us", Apple—Mac OS X—iChat AV, available at <http://www.apple.com/macosx/features/ichat/>, retrieved on Apr. 13, 2006, 3 pages.
IPhone Hacks, "Native iPhone MMS Application Released", available at <http://www.iphonehacks.com/2007/12/iphone-mms-app.html>, retrieved on Dec. 25, 2007, 5 pages.
IPhonechat, "iChat for iPhone in JavaScript", available at <http://www.publictivity.com/iPhoneChat/>, retrieved on Dec. 25, 2007, 2 pages.
Jabra, "Bluetooth Headset: User Manual", 2005, 17 pages.
IBM, "Integrated Audio-Graphics User Interface", IBM Technical Disclosure Bulletin, vol. 33, No. 11, Apr. 1991, 4 pages.
IBM, "Speech Recognition with Hidden Markov Models of Speech Waveforms", IBM Technical Disclosure Bulletin, vol. 34, No. 1, Jun. 1991, 10 pages.
Intraspect Software, "The Intraspect Knowledge Management Solution: Technical Overview", available at <http://tomgruber.org/writing/intraspect-whitepaper-1998.pdf>, 1998, 18 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Issar et al., "CMU's Robust Spoken Language Understanding System", Proceedings of Eurospeech, 1993, 4 pages.

(56) References Cited

OTHER PUBLICATIONS

Issar, Sunil, "Estimation of Language Models for New Spoken Language Applications", Proceedings of 4th International Conference on Spoken language Processing, Oct. 1996, 4 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.
Jennings et al., "A Personal News Service Based on a User Model Neural Network", IEICE Transactions on Information and Systems, vol. E75-D, No. 2, Mar. 1992, 12 pages.
Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.
Johnson, Julia Ann., "A Data Management Strategy for Transportable Natural Language Interfaces", Doctoral Thesis Submitted to the Department of Computer Science, University of British Columbia, Canada, Jun. 1989, 285 pages.
Jones, J., "Speech Recognition for Cyclone", Apple Computer, Inc., E.R.S. Revision 2.9, Sep. 10, 1992, 93 pages.
Julia et al., "http://www.speech.sri.com/demos/atis.html", Proceedings of AAAI, Spring Symposium, 1997, 5 pages.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kahn et al., "CoABS Grid Scalability Experiments", Autonomous Agents and Multi-Agent Systems, vol. 7, 2003, pp. 171-178.
Kamel et al., "A Graph Based Knowledge Retrieval System", IEEE International Conference on Systems, Man and Cybernetics, 1990, pp. 269-275.
Karp, P. D., "A Generic Knowledge-Base Access Protocol", Available online at <http://lecture.cs.buu.ac.th/-f50353/Document/gfp.pdf>, May 12, 1994, 66 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", Proceedings of the 5th RIAO Conference on Computer Assisted Information Searching on the Internet, 1997, 7 pages.
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.
Katz et al., "Exploiting Lexical Regularities in Designing Natural Language Systems", Proceedings of the 12th International Conference on Computational Linguistics, 1988, pp. 1-22.
Katz et al., "REXTOR: A System for Generating Relations from Natural Language", Proceedings of the ACL Workshop on Natural Language Processing and Information Retrieval (NLP&IR), Oct. 2000, 11 pages.
Katz, Boris, "Using English for Indexing and Retrieving", Proceedings of the 1st RIAO Conference on User-Oriented Content-Based Text and Image Handling, 1988, pp. 314-332.
Kitano, H., "PhiDM-Dialog, An Experimental Speech-to-Speech Dialog Translation System", Computer, vol. 24, No. 6, Jun. 1991, 13 pages.
Klabbers et al., "Reducing Audible Spectral Discontinuities", IEEE Transactions on Speech and Audio Processing, vol. 9, No. 1, Jan. 2001, 13 pages.
Klatt et al., "Linguistic Uses of Segmental Duration in English: Acoustic and Perpetual Evidence", Journal of the Acoustical Society of America, vol. 59, No. 5, May 1976, 16 pages.
Knownav, "Knowledge Navigator", YouTube Video available at <http://www.youtube.com/watch?v=QRH8eimU_20>, Apr. 29, 2008, 1 page.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Laird et al., "SOAR: An Architecture for General Intelligence", Artificial Intelligence, vol. 33, 1987, pp. 1-64.
Langley et al., "A Design for the ICARUS Architechture", SIGART Bulletin, vol. 2, No. 4, 1991, pp. 104-109.
Larks, "Intelligent Software Agents", available at <http://www.cs.cmu.edu/~softagents/larks.html> retrieved on Mar. 15, 2013, 2 pages.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.
Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.
Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent User Interfaces, Jan. 2005, pp. 231-238.
Lieberman et al., "Out of Context: Computer Systems that Adapt to, and Learn from, Context", IBM Systems Journal, vol. 39, No. 3 & 4, 2000, pp. 617-632.
Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.
Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.
Logan et al., "Mel Frequency Cepstral Co-efficients for Music Modeling", International Symposium on Music Information Retrieval, 2000, 2 pages.

(56) References Cited

OTHER PUBLICATIONS

Lowerre, B. T., "The-Harpy Speech Recognition System", Doctoral Dissertation, Department of Computer Science, Carnegie Mellon University, Apr. 1976, 20 pages.

Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.

* cited by examiner

INTEGRATED WORD N-GRAM AND CLASS M-GRAM LANGUAGE MODELS

CROSS-REFERENCE TO RELATED APPLICATION

This application claims priority from U.S. Provisional Ser. No. 62/057,177, filed on Sep. 29, 2014, entitled INTEGRATED WORD N-GRAM AND CLASS M-GRAM LANGUAGE MODELS, which is hereby incorporated by reference in its entirety for all purposes.

FIELD

This relates generally to discourse input processing and, more specifically, to the use of integrated word and class language models for discourse input processing.

BACKGROUND

Statistical language modeling can be implemented in many prediction and recognition applications, such as, for example, speech or handwriting recognition and text input prediction. An effective language model can be desirable to constrain the underlying pattern analysis, guide the search through various text hypotheses, and/or contribute to the determination of the final outcome. Conventionally, the paradigm for statistical language modeling has been to convey the probability of occurrence in the language of all possible strings of n words. Given a vocabulary of interest for the expected domain of use, this can be achieved through a word n-gram model, which can be trained to provide the probability of a word given the n−1 previous word(s). Training word n-gram models can typically involve large machine-readable text databases, comprising representative documents in the expected domain. However, due to the finite size of such databases, many occurrences of n-word strings are seen infrequently, yielding unreliable parameter values for all but the smallest values of n. Further, in some applications, it can be cumbersome or impractical to gather a large enough amount of training data. In other applications, the size of the resulting model may exceed what can reasonably be deployed.

SUMMARY

Systems and processes for processing discourse input are provided. In one example process, a discourse input can be received from a user. A text string corresponding to the discourse input can be determined. A conditional probability of a candidate word in the discourse input given one or more words in the discourse input can be determined using a first language model. A probability of the candidate word within a corpus can be determined using a second language model. A conditional probability of the candidate word given one or more classes associated with the one or more words can be determined using a third language model. An integrated probability of the candidate word and one or more subclasses associated with the candidate word can be determined based on the conditional probability of the candidate word given the one or more words, the probability of the candidate word within the corpus, and the conditional probability of the candidate word given the one or more classes. The text string can be determined based on the integrated probability. An output can be determined based on the text string.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

The present disclosure relates to discourse input processing using an integrated word and class language model. As described in greater detail below, it can be desirable to combine a word language model with a class language model to leverage the advantages of both models. However, using conventional interpolation or maximum entropy formulation to combine the models can result in a relatively coarse model combination where the relative influence of the two models is specified in a global fashion based on broad ranges of language model probabilities. It can thus be desirable to integrate the word model and the class model at a finer level of granularity. For example, the word and class language models can be integrated based on the specific identity of the local context, such as the frequency of occurrence of the current word in the training corpus. Processing discourse inputs using such an integrated model can result in greater accuracy and robustness.

In one example process, a discourse input can be received from a user. An integrated probability of a candidate word in the discourse input and one or more subclasses associated with the candidate word can be determined based on a conditional probability of the candidate word given one or more words in the discourse input, a probability of the candidate word within a corpus, and a conditional probability of the candidate word given one or more classes associated with the one or more words. The probability of the candidate word within the corpus can determine the relative contribution of the conditional probability of the candidate word given the one or more words and the conditional probability of the candidate word given one or more classes to the integrated probability. A text string corresponding to the discourse input can be determined based on the integrated probability. An output based on the text string can be generated.

1. System and Environment

Figure 1:
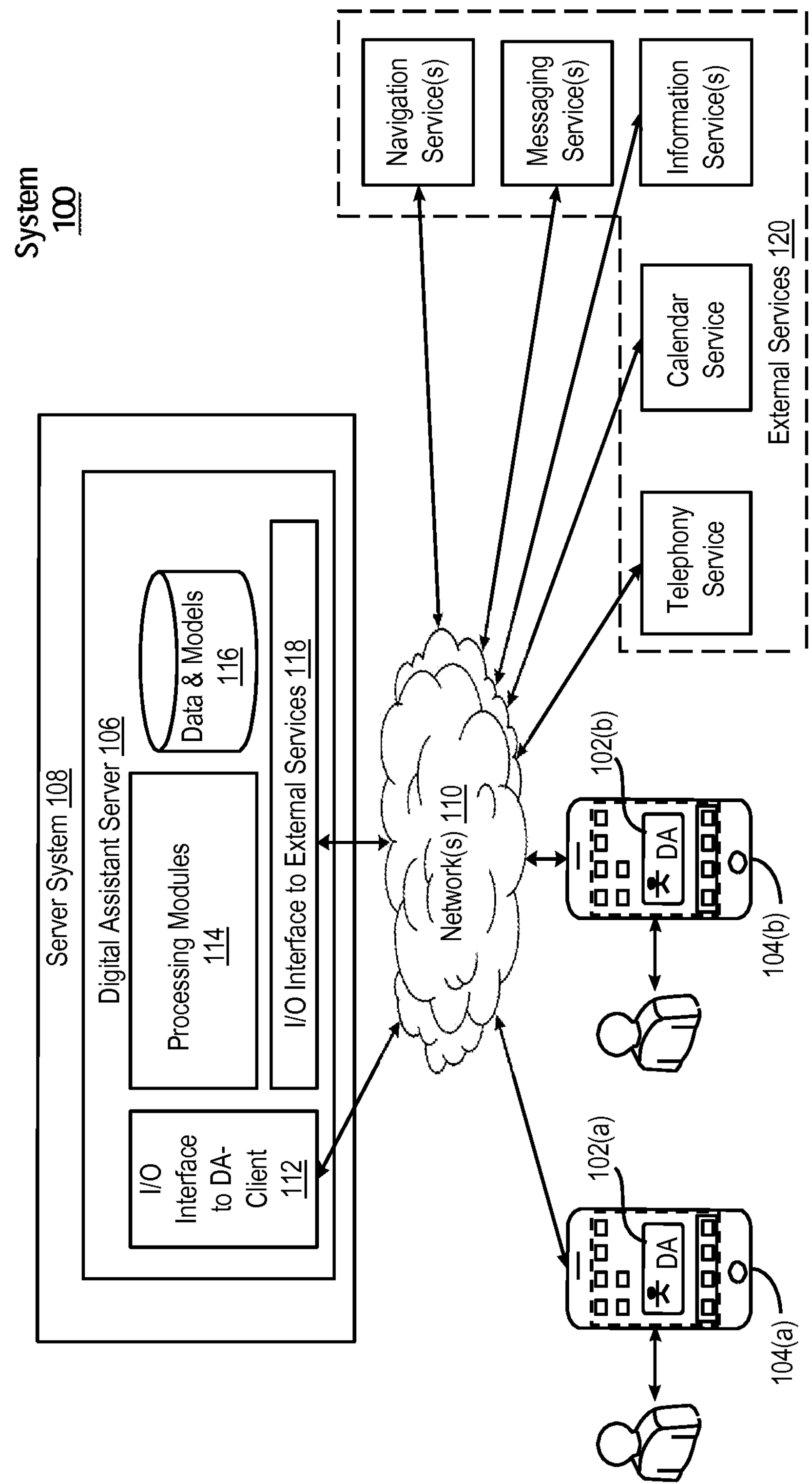
FIG. 1 illustrates a system and environment for implementing a digital assistant according to various examples.

FIG. 1 illustrates a block diagram of a system 100 according to various examples. In some examples, the system 100 can implement a digital assistant. The terms "digital assistant," "virtual assistant," "intelligent automated assistant," or "automatic digital assistant," can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying, "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant also can provide responses in other visual or audio forms, e.g., as texts, alerts, music, videos, animations, etc.

An example of a digital assistant is described in Applicant's U.S. Utility application Ser. No. 12/987,982 for "Intelligent Automated Assistant," filed Jan. 10, 2011, the entire disclosure of which is incorporated herein by reference.

As shown in FIG. 1, in some examples, a digital assistant can be implemented according to a client-server model. The digital assistant can include a client-side portion 102*a*, 102*b* (hereafter "DA client 102") executed on a user device 104*a*, 104*b*, and a server-side portion 106 (hereafter "DA server 106") executed on a server system 108. The DA client 102 can communicate with the DA server 106 through one or more networks 110. The DA client 102 can provide client-side functionalities such as user-facing input and output processing and communication with the DA server 106. The DA server 106 can provide server-side functionalities for any number of DA clients 102 each residing on a respective user device 104.

In some examples, the DA server 106 can include a client-facing I/O interface 112, one or more processing modules 114, data and models 116, and an I/O interface to external services 118. The client-facing I/O interface can facilitate the client-facing input and output processing for the DA server 106. The one or more processing modules 114 can utilize the data and models 116 to process speech input and determine the user's intent based on natural language input. Further, the one or more processing modules 114 perform task execution based on inferred user intent. In some examples, the DA server 106 can communicate with external services 120 through the network(s) 110 for task completion or information acquisition. The I/O interface to external services 118 can facilitate such communications.

Examples of the user device 104 can include, but are not limited to, a handheld computer, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a television set-top box, a remote control, a wearable electronic device, or a combination of any two or more of these data processing devices or other data processing devices. More details on the user device 104 are provided in reference to an exemplary user device 104 shown in FIG. 2.

Examples of the communication network(s) 110 can include local area networks ("LAN") and wide area networks ("WAN"), e.g., the Internet. The communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on one or more standalone data processing apparatus or a distributed network of computers. In some examples, the server system 108 can also employ various virtual devices and/or services of third-party service providers (e.g., third-party cloud service providers) to provide the underlying computing resources and/or infrastructure resources of the server system 108.

Although the digital assistant shown in FIG. 1 can include both a client-side portion (e.g., the DA client 102) and a server-side portion (e.g., the DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. User Device

Figure 2:
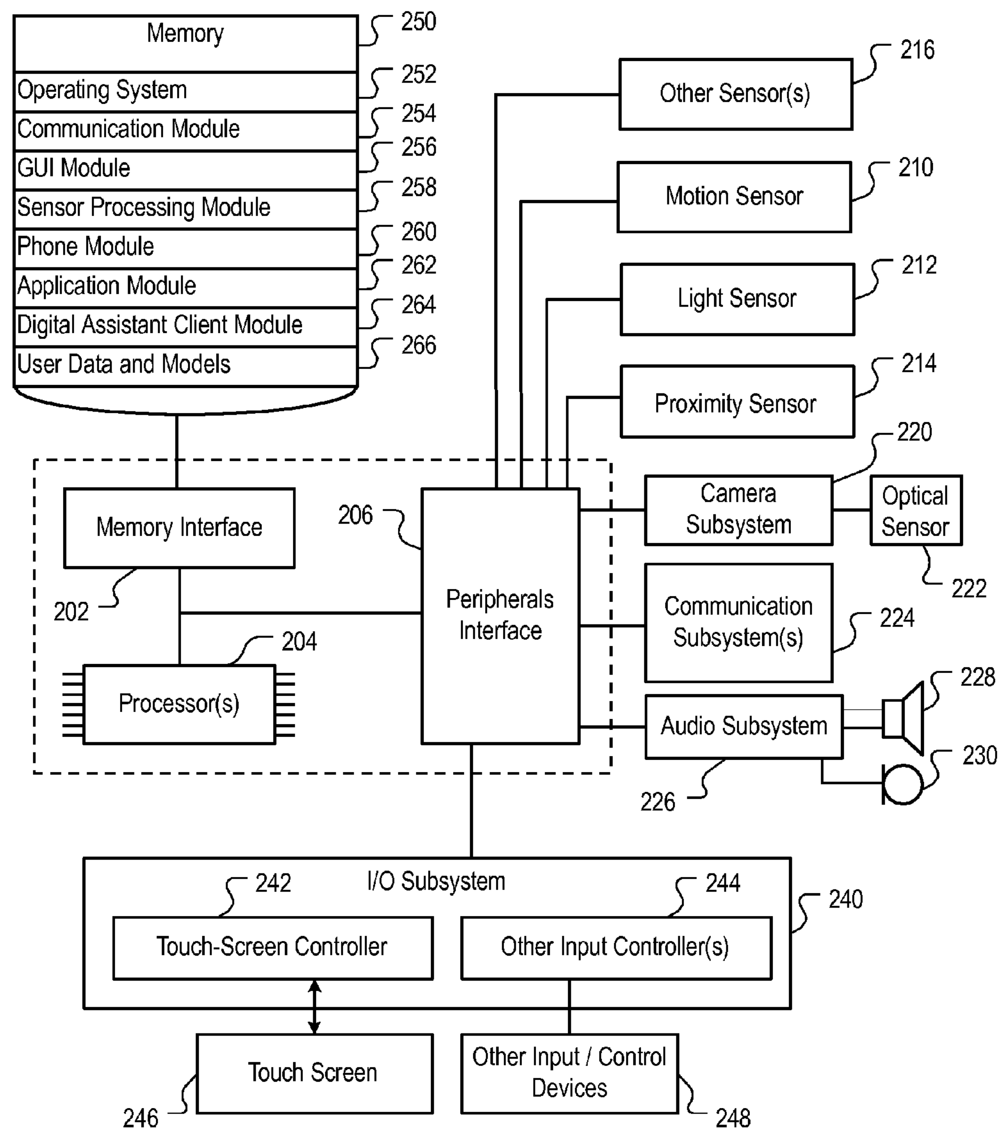
FIG. 2 illustrates a user device implementing the client-side portion of a digital assistant according to various examples.

FIG. 2 illustrates a block diagram of a user device 104 in accordance with various examples. The user device 104 can include a memory interface 202, one or more processors 204, and a peripherals interface 206. The various components in the user device 104 can be coupled by one or more communication buses or signal lines. The user device 104 can include various sensors, subsystems, and peripheral devices that are coupled to the peripherals interface 206. The sensors, subsystems, and peripheral devices can gather information and/or facilitate various functionalities of the user device 104.

For example, a motion sensor 210, a light sensor 212, and a proximity sensor 214 can be coupled to the peripherals interface 206 to facilitate orientation, light, and proximity sensing functions. One or more other sensors 216, such as a positioning system (e.g., GPS receiver), a temperature sensor, a biometric sensor, a gyro, a compass, an accelerometer, and the like, can also be connected to the peripherals interface 206 to facilitate related functionalities.

In some examples, a camera subsystem 220 and an optical sensor 222 can be utilized to facilitate camera functions, such as taking photographs and recording video clips. Communication functions can be facilitated through one or more wired and/or wireless communication subsystems 224, which can include various communication ports, radio frequency receivers and transmitters, and/or optical (e.g., infrared) receivers and transmitters. An audio subsystem 226 can be coupled to speakers 228 and a microphone 230 to facilitate voice-enabled functions, such as voice recognition, voice replication, digital recording, and telephony functions. The microphone 230 can be configured to receive a speech input from the user.

In some examples, an I/O subsystem 240 can also be coupled to the peripherals interface 206. The I/O subsystem 240 can include a touch screen controller 242 and/or other input controller(s) 244. The touch-screen controller 242 can be coupled to a touch screen 246. The touch screen 246 and the touch screen controller 242 can, for example, detect contact and movement or break thereof using any of a plurality of touch sensitivity technologies, such as capacitive, resistive, infrared, surface acoustic wave technologies, proximity sensor arrays, and the like. The other input controller(s) 244 can be coupled to other input/control devices 248, such as one or more buttons, rocker switches, thumb-wheel, infrared port, USB port, and/or a pointer device such as a stylus.

In some examples, the memory interface 202 can be coupled to memory 250. The memory 250 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of the memory 250 can be used to store instructions (e.g., for performing the processes 400, 500, 600, and 700, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing the processes 400, 500, 600, and 700, described below) can be stored on a non-transitory computer-readable storage medium (not shown) of the server system 108, or can be divided between the non-transitory computer-readable storage medium of memory 250 and the non-transitory computer-readable storage medium of server system 108. In the context of this document, a "non-transitory computer readable storage medium" can be any medium that can contain or store the program for use by or in connection with the instruction execution system, apparatus, or device.

In some examples, the memory 250 can store an operating system 252, a communication module 254, a user interface module 256, a sensor processing module 258, a phone module 260, and applications module 262. The operating system 252 can include instructions for handling basic system services and for performing hardware dependent tasks. The communication module 254 can facilitate communicating with one or more additional devices, one or more computers and/or one or more servers. The user interface module 256 can facilitate graphic user interface processing and output processing using other output channels (e.g., speakers). The sensor processing module 258 can facilitate sensor-related processing and functions. The phone module 260 can facilitate phone-related processes and functions. The application module 262 can facilitate various functionalities of user applications, such as electronic-messaging, web browsing, media processing, Navigation, imaging, and/or other processes and functions.

As described herein, the memory 250 can also store client-side digital assistant instructions (e.g., in a digital assistant client module 264) and various user data 266 (e.g., user-specific vocabulary data, preference data, and/or other data such as the user's electronic address book, to-do lists, shopping lists, user-specified name pronunciations, etc.) to provide the client-side functionalities of the digital assistant.

In various examples, the digital assistant client module 264 can be capable of accepting voice input (e.g., speech input), text input, touch input, and/or gestural input through various user interfaces (e.g., the I/O subsystem 240) of the user device 104. The digital assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, the digital assistant client module 264 can communicate with the DA server 106 using the communication subsystems 224.

In some examples, the digital assistant client module 264 can utilize the various sensors, subsystems, and peripheral devices to gather additional information from the surrounding environment of the user device 104 to establish a context associated with a user, the current user interaction, and/or the current user input. In some examples, the digital assistant client module 264 can provide the context information or a subset thereof with the user input to the digital assistant server to help infer the user's intent. In some examples, the digital assistant can also use the context information to determine how to prepare and deliver outputs to the user.

In some examples, the context information that accompanies the user input can include sensor information, e.g., lighting, ambient noise, ambient temperature, images or videos of the surrounding environment, etc. In some examples, the context information can also include the physical state of the device, e.g., device orientation, device location, device temperature, power level, speed, acceleration, motion patterns, cellular signals strength, etc. In some examples, information related to the software state of the user device 104, e.g., running processes, installed programs, past and present network activities, background services, error logs, resources usage, etc., of the user device 104 can be provided to the digital assistant server as context information associated with a user input.

In some examples, the DA client module 264 can selectively provide information (e.g., user data 266) stored on the user device 104 in response to requests from the DA server. In some examples, the digital assistant client module 264 can also elicit additional input from the user via a natural language dialogue or other user interfaces upon request by the DA server 106. The DA client module 264 can pass the additional input to the digital assistant server 106 to help the digital assistant server 106 in intent deduction and/or fulfillment of the user's intent expressed in the user request.

In various examples, the memory 250 can include additional instructions or fewer instructions. For example, the DA client module 264 can include any of the sub-modules of the digital assistant module 326 described below in FIG. 3A. Furthermore, various functions of the user device 104 can be implemented in hardware and/or in firmware, including in one or more signal processing and/or application specific integrated circuits.

3. Digital Assistant System

Figure 3A:
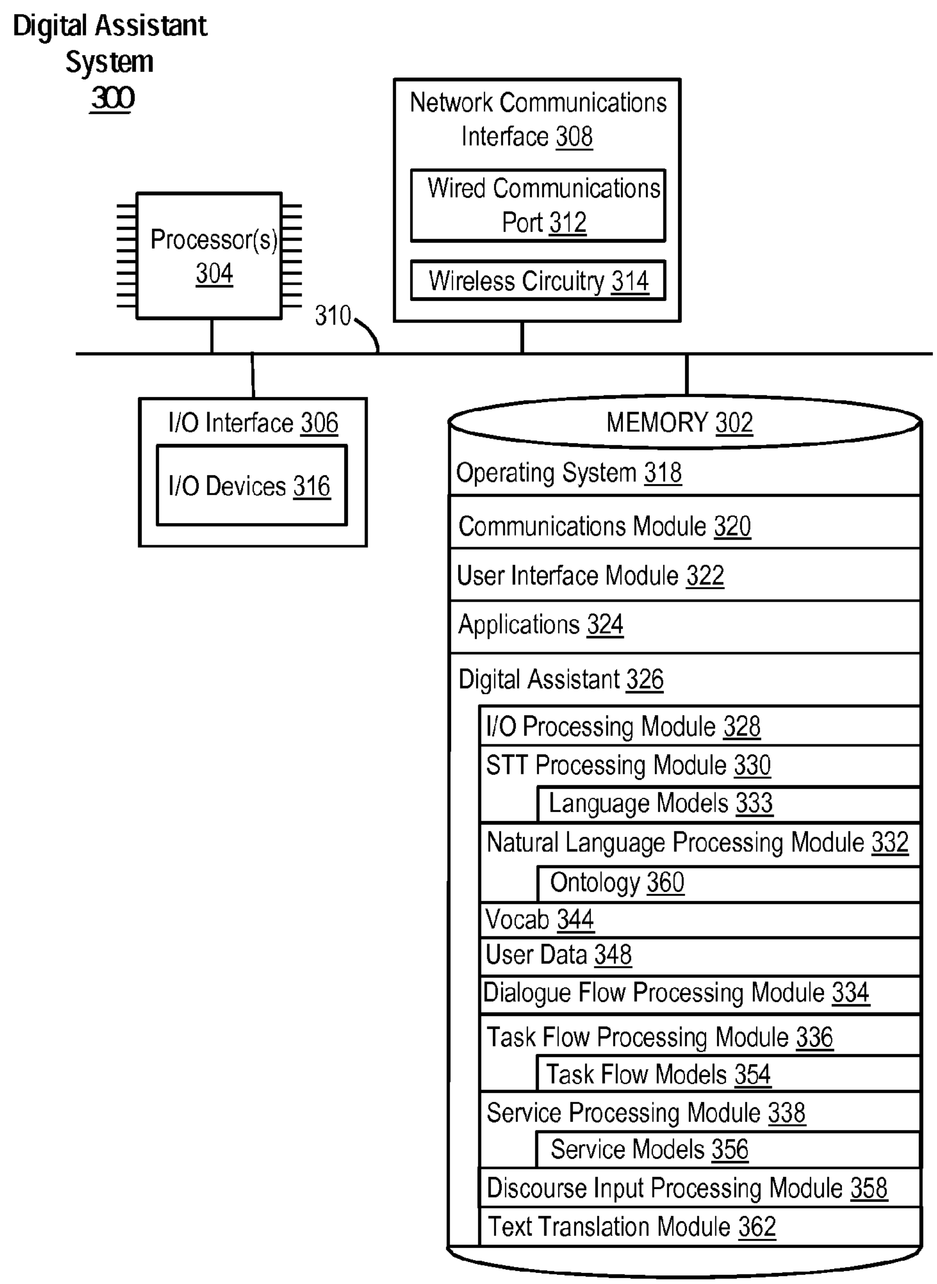
FIG. 3A illustrates a digital assistant system or a server portion thereof according to various examples.

FIG. 3A illustrates a block diagram of an example digital assistant system 300 in accordance with various examples. In some examples, the digital assistant system 300 can be implemented on a standalone computer system. In some examples, the digital assistant system 300 can be distributed across multiple computers. In some examples, some of the modules and functions of the digital assistant can be divided into a server portion and a client portion, where the client portion resides on a user device (e.g., the user device 104) and communicates with the server portion (e.g., the server system 108) through one or more networks, e.g., as shown in FIG. 1. In some examples, the digital assistant system 300 can be an implementation of the server system 108 (and/or the DA server 106) shown in FIG. 1. It should be noted that the digital assistant system 300 is only one example of a digital assistant system, and that the digital assistant system 300 can have more or fewer components than shown, may combine two or more components, or may have a different configuration or arrangement of the components. The various components shown in FIG. 3A can be implemented in hardware, software instructions for execution by one or more processors, firmware, including one or more signal processing and/or application specific integrated circuits, or a combination thereof.

The digital assistant system 300 can include memory 302, one or more processors 304, an input/output (I/O) interface 306, and a network communications interface 308. These components can communicate with one another over one or more communication buses or signal lines 310.

In some examples, the memory 302 can include a non-transitory computer readable medium, such as high-speed random access memory and/or a non-volatile computer-readable storage medium (e.g., one or more magnetic disk storage devices, flash memory devices, or other non-volatile solid-state memory devices).

In some examples, the I/O interface 306 can couple input/output devices 316 of the digital assistant system 300, such as displays, keyboards, touch screens, and microphones, to the user interface module 322. The I/O interface 306, in conjunction with the user interface module 322, can receive user inputs (e.g., voice input, keyboard inputs, touch inputs, etc.) and processes them accordingly. In some examples, e.g., when the digital assistant is implemented on a standalone user device, the digital assistant system 300 can include any of the components and I/O and communication interfaces described with respect to the user device 104 in FIG. 2. In some examples, the digital assistant system 300 can represent the server portion of a digital assistant implementation, and can interact with the user through a client-side portion residing on a user device (e.g., the user device 104 shown in FIG. 2).

In some examples, the network communications interface 308 can include wired communication port(s) 312 and/or wireless transmission and reception circuitry 314. The wired communication port(s) can receive and send communication signals via one or more wired interfaces, e.g., Ethernet, Universal Serial Bus (USB), FIREWIRE, etc. The wireless circuitry 314 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. The network communications interface 308 can enable communication between the digital assistant system 300 with networks, such as the Internet, an intranet and/or a wireless network, such as a cellular telephone network, a wireless local area network (LAN) and/or a metropolitan area network (MAN), and other devices.

In some examples, memory 302, or the computer readable storage media of memory 302, can store programs, modules, instructions, and data structures including all or a subset of: an operating system 318, a communications module 320, a user interface module 322, one or more applications 324, and a digital assistant module 326. In particular, memory 302, or the computer readable storage media of memory 302, can store instructions for performing the process 400, described below. The one or more processors 304 can execute these programs, modules, and instructions, and reads/writes from/to the data structures.

The operating system 318 (e.g., Darwin, RTXC, LINUX, UNIX, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

The communications module 320 can facilitate communications between the digital assistant system 300 with other devices over the network communications interface 308. For example, the communications module 320 can communicate with the communication module 254 of the device 104 shown in FIG. 2. The communications module 320 can also include various components for handling data received by the wireless circuitry 314 and/or wired communications port 312.

The user interface module 322 can receive commands and/or inputs from a user via the I/O interface 306 (e.g., from a keyboard, touch screen, pointing device, controller, and/or microphone), and generate user interface objects on a display. The user interface module 322 can also prepare and deliver outputs (e.g., speech, sound, animation, text, icons, vibrations, haptic feedback, and light, etc.) to the user via the I/O interface 306 (e.g., through displays, audio channels, speakers, and touch-pads, etc.).

The applications 324 can include programs and/or modules that are configured to be executed by the one or more processors 304. For example, if the digital assistant system is implemented on a standalone user device, the applications 324 can include user applications, such as games, a calendar application, a navigation application, or an email application. If the digital assistant system 300 is implemented on a server farm, the applications 324 can include resource management applications, diagnostic applications, or scheduling applications, for example.

The memory 302 can also store the digital assistant module (or the server portion of a digital assistant) 326. In some examples, the digital assistant module 326 can include the following sub-modules, or a subset or superset thereof: an input/output processing module 328, a speech-to-text (STT) processing module 330, a natural language processing module 332, a dialogue flow processing module 334, a task flow processing module 336, a service processing module 338, a discourse input processing module 358, and a text translation module 362. Each of these modules can have access to one or more of the following data and models of the digital assistant module 326, or a subset or superset thereof: language models 333, ontology 360, vocabulary index 344, user data 348, task flow models 354, and service models 356.

In some examples, using the processing modules, data, and models implemented in the digital assistant module 326, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 3B:
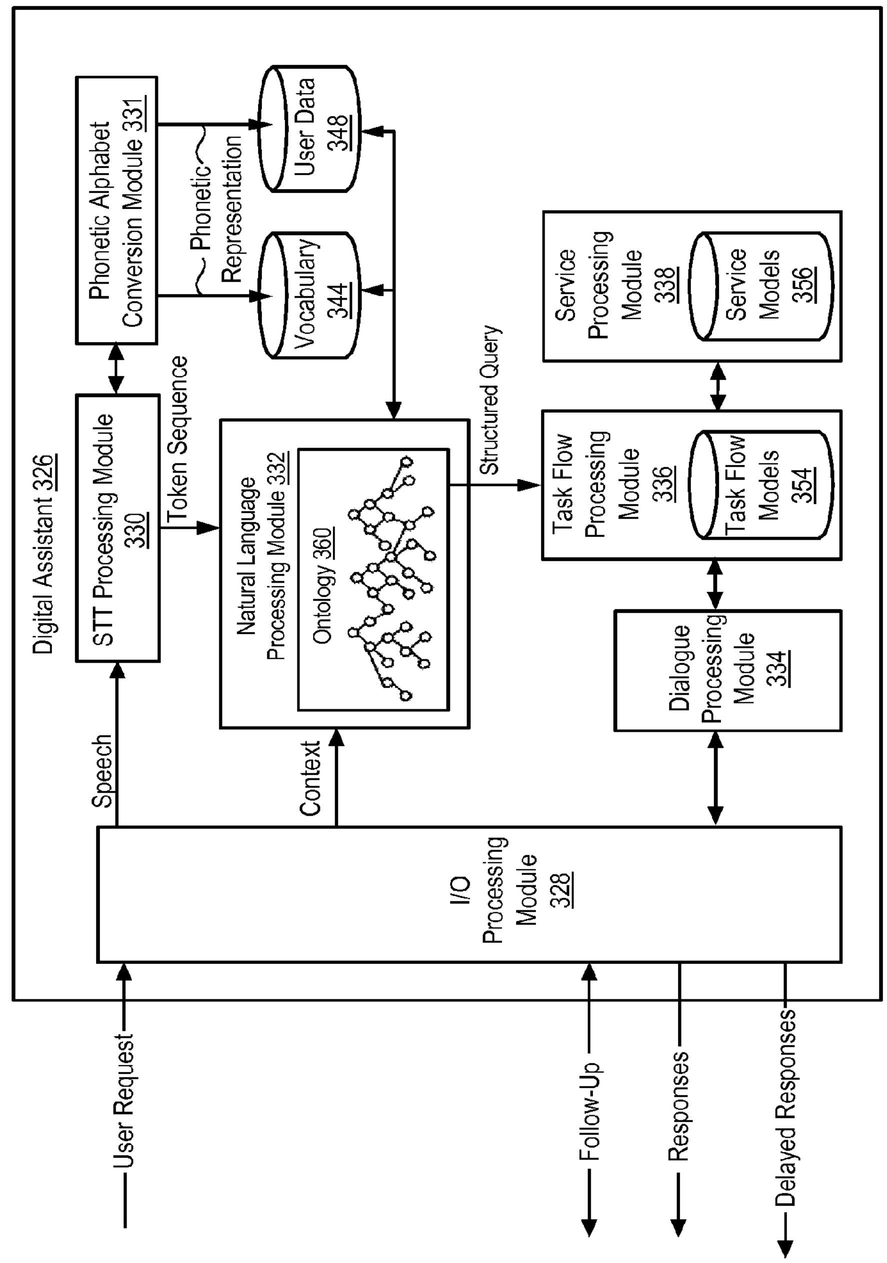
FIG. 3B illustrates the functions of the digital assistant shown in FIG. 3A according to various examples.

In some examples, as shown in FIG. 3B, the I/O processing module 328 can interact with the user through the I/O devices 316 in FIG. 3A or with a user device (e.g., a user device 104 in FIG. 1) through the network communications interface 308 in FIG. 3A to obtain user input (e.g., a speech input) and to provide responses (e.g., as speech outputs) to the user input. The I/O processing module 328 can optionally obtain context information associated with the user input from the user device, along with or shortly after the receipt of the user input. The context information can include user-specific data, vocabulary, and/or preferences relevant to the user input. In some examples, the context information also includes software and hardware states of the device (e.g., the user device 104 in FIG. 1) at the time the user request is received, and/or information related to the surrounding environment of the user at the time that the user request was received. In some examples, the I/O processing module 328 can also send follow-up questions to, and receive answers from, the user regarding the user request. When a user request is received by the I/O processing module 328 and the user request can include speech input, the I/O processing module 328 can forward the speech input to the STT processing module 330 (or speech recognizer) for speech-to-text conversions.

The STT processing module 330 can include an automatic speech recognition (ASR) system. The ASR system can process the speech input that is received through the I/O processing module 328 to produce a recognition result. The ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, the ASR system can implement one or more speech recognition engines and one or more speech recognition models. Examples of speech recognition engines can include the dynamic time warping based engines and weighted finite-state transducers (WFST) based engines. Examples of speech recognition models can include Hidden Markov Models, Gaussian-Mixture Models, Deep Neural Network Models, n-gram models, and other statistical models. In some examples, the speech recognition models can include the language models 333 of the STT processing module 330. The language models 333 can include one or more of a word n-gram language model, a class m-gram language model, a word unigram language model, and an integrated word and class language model. The one or more speech recognition models and the one or more speech recognition engines can be used to process the extracted representative features of the front-end speech pre-processor to produce intermediate recognitions results (e.g., phonemes, sequence of phonemes, and sub-words), and ultimately, text recognition results (e.g., words, sequence of words, or sequence of tokens). In some examples, the speech input can be processed at least partially by a third-party service or on the user's device (e.g., user device 104) to produce the recognition result. Once the STT processing module 330 produces recognition results containing text (e.g., words, or sequence of words, or sequence of tokens), the recognition result can be passed to the natural language processing module 332 for intent deduction.

In some examples, the STT processing module 330 can include and/or access a vocabulary of recognizable words via a phonetic alphabet conversion module 331. Each vocabulary word can be associated with one or more candidate pronunciations of the word represented in a speech recognition phonetic alphabet. For example, the vocabulary may include the word "tomato" in association with the candidate pronunciations of "tuh-may-doe" and "tuh-mah-doe." In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation "tuh-may-doe" can be ranked higher than "tuh-mah-doe," because the former is a more commonly used pronunciation (e.g., among all users, for users in a particular geographical region, or for any other appropriate subset of users). In some examples, one of the candidate pronunciations can be selected as a predicted pronunciation (e.g., the most likely pronunciation).

When a speech input is received, the STT processing module 330 can be used to determine the phonemes corresponding to the speech input (e.g., using an acoustic model), and then attempt to determine words that match the phonemes (e.g., using a language model). For example, if the STT processing module 330 can first identify the sequence of phonemes "tuh-may-doe" corresponding to a portion of the speech input, it can then determine, based on the vocabulary index 344, that this sequence corresponds to the word "tomato."

In some examples, the STT processing module 330 can use approximate matching techniques to determine words in an utterance. Thus, for example, the STT processing module 330 can determine that the sequence of phonemes "duh-may-doe" corresponds to the word "tomato," even if that particular sequence of phonemes is not one of the candidate phonemes for that word.

In some examples, the STT processing module 330 can be capable of determining a combined result based on two or more recognition results. For example, STT processing module 330 can be capable of performing blocks 414, 424, and 430 of process 400 described below.

The natural language processing module 332 ("natural language processor") of the digital assistant can take the sequence of words or tokens ("token sequence") generated by the STT processing module 330, and attempt to associate the token sequence with one or more "actionable intents" recognized by the digital assistant. An "actionable intent" can represent a task that can be performed by the digital assistant, and can have an associated task flow implemented in the task flow models 354. The associated task flow can be a series of programmed actions and steps that the digital assistant takes in order to perform the task. The scope of a digital assistant's capabilities can be dependent on the number and variety of task flows that have been implemented and stored in the task flow models 354, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from the STT processing module 330, the natural language processing module 332 can also receive context information associated with the user request, e.g., from the I/O processing module 328. The natural language processing module 332 can optionally use the context information to clarify, supplement, and/or further define the information contained in the token sequence received from the STT processing module 330. The context information can include, for example, user preferences, hardware and/or software states of the user device, sensor information collected before, during, or shortly after the user request, prior interactions (e.g., dialogue) between the digital assistant and the user, and the like. As described herein, context information can be dynamic, and can change with time, location, content of the dialogue, and other factors.

In some examples, the natural language processing can be based on, for example, ontology 360. The ontology 360 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in the ontology 360 can define how a parameter represented by the property node pertains to the task represented by the actionable intent node.

The natural language processing module 332 can receive the token sequence (e.g., a text string) from the STT processing module 330, and determine what nodes are implicated by the words in the token sequence. In some examples, if a word or phrase in the token sequence is found to be associated with one or more nodes in the ontology 360 (via the vocabulary index 344), the word or phrase can "trigger" or "activate" those nodes. Based on the quantity and/or relative importance of the activated nodes, the natural language processing module 332 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 348 can include user-specific information, such as user-specific vocabulary, user preferences, user address, user's default and secondary languages, user's contact list, and other short-term or long-term information for each user. In some examples, the natural language processing module 332 can use the user-specific information to supplement the information contained in the user input to further define the user intent. For example, for a user request "invite my friends to my birthday party," the natural language processing module 332 can be able to access user data 348 to determine who the "friends" are and when and where the "birthday party" would be held, rather than requiring the user to provide such information explicitly in his/her request.

In some examples, once the natural language processing module 332 identifies an actionable intent (or domain) based on the user request, the natural language processing module 332 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, the natural language processing module 332 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using the STT processing module 330, the natural language processing module 332 can generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} may not be specified in the structured query based on the information currently available. In some examples, the natural language processing module 332 can populate some parameters of the structured query with received context information. For example, in some examples, if the user requested a sushi restaurant "near me," the natural language processing module 332 can populate a {location} parameter in the structured query with GPS coordinates from the user device 104.

In some examples, the natural language processing module 332 can pass the structured query (including any completed parameters) to the task flow processing module 336 ("task flow processor"). The task flow processing module 336 can be configured to receive the structured query from the natural language processing module 332, complete the structured query, if necessary, and perform the actions required to "complete" the user's ultimate request. In some examples, the various procedures necessary to complete these tasks can be provided in task flow models 354. In some examples, the task flow models can include procedures for obtaining additional information from the user, and task flows for performing actions associated with the actionable intent.

As described above, in order to complete a structured query, the task flow processing module 336 may need to initiate additional dialogue with the user in order to obtain additional information, and/or disambiguate potentially ambiguous utterances. When such interactions are necessary, the task flow processing module 336 can invoke the dialogue flow processing module 334 to engage in a dialogue with the user. In some examples, the dialogue flow processing module 334 can determine how (and/or when) to ask the user for the additional information, and receives and processes the user responses. The questions can be provided to and answers can be received from the users through the I/O processing module 328. In some examples, the dialogue flow processing module 334 can present dialogue output to the user via audio and/or visual output, and receives input from the user via spoken or physical (e.g., clicking) responses. Continuing with the example above, when the task flow processing module 336 invokes the dialogue flow processing module 334 to determine the "party size" and "date" information for the structured query associated with the domain "restaurant reservation," the dialogue flow processing module 334 can generate questions such as "For how many people?" and "On which day?" to pass to the user. Once answers are received from the user, the dialogue flow processing module 334 can then populate the structured query with the missing information, or pass the information to the task flow processing module 336 to complete the missing information from the structured query.

Once the task flow processing module 336 has completed the structured query for an actionable intent, the task flow processing module 336 can proceed to perform the ultimate task associated with the actionable intent. Accordingly, the task flow processing module 336 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processing module 336 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, the task flow processing module 336 can employ the assistance of a service processing module 338 to complete a task requested in the user input or to provide an informational answer requested in the user input. For example, the service processing module 338 can act on behalf of the task flow processing module 336 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among the service models 356. The service processing module 338 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by the task flow processing module 336, the service processing module 338 can establish a network connection with the online reservation service using the web address stored in the service model, and send the necessary parameters of the reservation (e.g., time, date, party size) to the online reservation interface in a format according to the API of the online reservation service.

In some examples, the natural language processing module 332, dialogue flow processing module 334, and task flow processing module 336 can be used collectively and iteratively to infer and define the user's intent, obtain information to further clarify and refine the user intent, and finally generate a response (i.e., an output to the user, or the completion of a task) to fulfill the user's intent.

The discourse input processing module 358 can be capable of converting various forms of discourse input (e.g., handwriting input, gesture input, and the like) into corresponding text. For example, the discourse input processing module 358 can include handwriting or gesture recognition models and algorithms for converting handwriting or gesture input into corresponding text strings. In some examples, the discourse input processing module 358 can utilize the language models 333 to convert various forms of discourse input into corresponding text.

The text translation module 362 can be capable of converting text input of a first language into corresponding text of a second language. For example, the text translation module 362 can include a machine translation engine and various machine translation models for determining the text string of the second language that corresponds to the text input of the first language. In some examples, the text translation module 362 can use the language models 333 to convert the text input of the first language into corresponding text of the second language.

It should be recognized that in some examples, one or more of the modules (e.g., the STT processing module 330 discourse input processing module 358, the text translation module, etc.) in the digital assistant module 326 can be stored separate from the digital assistant module in the memory 302. Further, in some examples, the digital assistant system 300 can further include a text prediction module (not shown) stored in memory 302. The text prediction module can be capable of determining a predicted text based on one or more inputted words. In some examples, the text prediction module can utilize one or more language models (e.g., the language models 333) to determining the predicted text.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Integrated Word and Class Language Model

As described above, word n-gram models can yield unreliable results for infrequently occurring n-word strings due to the finite sizes of text databases used to train the word n-gram models. To address this limitation, it can be expedient to rely on class m-gram models. Class m-gram models are based on the assignment of words to a small number of classes (e.g., parts-of-speech classes), as well as the probability of a class given the m−1 previous classes observed. Because the inventory of classes in a class m-gram model can typically be much smaller than the underlying vocabulary of words, a class m-gram model can be significantly more compact than a word n-gram model, even with m>n. As a result, significantly less training data is necessary to achieve reliable estimation.

While class m-gram models can be advantageous in being more compact and easier to estimate than word n-grams, class m-gram models can also be less accurate due to the inherent quantization involved. On the other hand, class m-gram models can avoid the more or less arbitrary smoothing techniques that are typically implemented to alleviate the data sparsity issues inherent to word n-gram models with n that is 3 or more. In particular, class m-gram models can tend to be more robust, in the sense that they can generalize better in situations of data sparsity.

The characteristics of word n-gram models and class m-gram models can be recognized as complementary. In particular, the word n-gram model can provide a more accurate estimation for events that are well represented in the training corpus, while the class m-gram can provide a more robust estimation for rarer and unseen events. It can thus be desirable to integrate word n-gram and class m-gram models together to leverage the advantages of both models. Traditionally, word n-gram and class m-gram models can be integrated via simple or deleted interpolation or maximum entropy formulation. Both techniques can utilize weight parameters to determine how much to rely on one model versus the other. The weight parameters can typically be selected empirically or estimated based on held-out data. Utilizing weight parameters can result in relatively coarse model combination where the relative influence of the two models is specified in a global fashion based on broad ranges of language model probabilities. To achieve higher accuracy and robustness, it can be desirable to balance the two models at a finer level of granularity. For example, the word n-gram and class m-gram models can be integrated based not only on general frequency of occurrence but also on the specific identity of the local context. This enables weighting to be performed on a local rather than global level. Such an approach is described in greater detail below.

For reference, let $W_{q-n+1}^{q}=w_{q-n+2} \ldots w_{q-1}w_q$ denote a string of n words. Generally, $w_q$ can refer to the current word and the preceding n−1 words $W_{q-n}^{q}$ can refer to the word history. For text prediction, $w_q$ can refer to the predicted word and the preceding n−1 words $W_{q-n}^{q}$ can refer to the context or the word history used to determine the predicted word $w_q$. For applications such as speech recognition, handwriting recognition, machine translation, and the like, $w_q$ can refer to the candidate word and the preceding n−1 words $W_{q-n}^{q}$ can refer to the word history.

Further, let $C_{q-m+1}^{q-1}=c_{q-m+2} \ldots c_{q-1}c_q$ denote a string of m classes corresponding to the string of n words $W_{q-n+1}^{q}$. Each class $c_i$ in the string of m classes $C_{q-m+1}^{q}$ can take values from a small set of subclasses $\{\lambda_{k_i}\}$, $1 \le k_i \le K_i$ (for $q-m+1 \le i \le q$). A subclass can include any predetermined category used to classifying the words of a given language, such as parts-of-speech classes or semantic classes. For example, with respect to parts-of-speech classes, each class $c_i$ can include one more of the following subclasses: noun, verb, adjective, adverb, conjunction, pronoun, article, preposition, interjection, and the like. Further, in some examples, the parts-of-speech classes can be divided according to semantic classes. For example, nouns can be broken into semantic classes such as location nouns (e.g., cities, landmarks, restaurants, etc.), person nouns (e.g., names of individuals), nouns associated with food, and the like. Because each class $c_i$ in the string of m classes $C_{q-m+1}^{q}$ can include one or more subclasses, the string of m classes $C_{q-m+1}^{q}$ can be a set of strings of the form $\Lambda_{k_q-m+1}^{k_q}=\lambda_{k_q-m+1}\lambda_{k_q-m+2} \ldots \lambda_{k_q-1}\lambda_{k_q}$, where each index $k_i$ ranges over its respective interval (for $q-m+1 \le i \le q$).

In an illustrative example, a string of n=3 words $W_{q-2}^{q}$ can be "I like you." The parts-of-speech subclass corresponding to the words "I" and "you" can each be {pronoun} while the parts-of-speech subclasses corresponding to the word "like" can include {verb}, {adjective}, {preposition}, {noun}, {adverb}, and {conjunction}. Therefore, in this example, the string of classes $C_{q-2}^{q}$ corresponding to the string of words $W_{q-2}^{q}$ "I like you" can include the following set of class strings {pronoun, verb, pronoun}, {pronoun, adjective, pronoun}, {pronoun, preposition, pronoun}, {pronoun, noun, pronoun}, {pronoun, adverb, pronoun}, and {pronoun, conjunction, pronoun}.

The probability of a current word $w_q$ given the word history $W_{q-n+1}^{q-1}$ (e.g., the relevant string of n−1 words) can be expressed as:

$$Pr(w_q|W_{q-n+1}^{q-1}) \tag{1}$$

$Pr(w_q|W_{q-n+1}^{q-1}$ in expression (1) can be determined using a word n-gram language model.

Further, the probability of the current word $w_q$ given the current class values $c_q$ as well as the relevant class history $C_{q-m+1}^{q}$ can be expressed as:

$$Pr(w_q|C_{q-m+1}^{q})=\sum_{k_q=1}^{K_q} Pr(w_q|\lambda_{k_q}) \cdot Pr(\lambda_{k_q}|C_{q-m+1}^{q-1}). \tag{2}$$

In expression (2), the quantity $Pr(w_q|\lambda_{k_q})$ can denote the assignment of the current word $w_q$ to a specific subclass $\lambda_{k_q}$ (e.g., a specific part-of-speech) and $Pr(\lambda_{k_q}|C_{q-m+1}^{q-1})$ can denote the probability of this specific subclass $\lambda_{k_q}$ given the class m-gram history $C_{q-m+1}^{q-1}$ corresponding to the word history $W_{q-n+1}^{q-1}$. $Pr(w_q|C_{q-m+1}^{q-1})$ in expression (2) can be determined using a class m-gram language model. It should be recognized that at the word level, the class m-gram model can have the same order as a word unigram model where context is only taken into account at the class level.

As described above, each class $c_i$, in the string of m classes $C_{q-m+1}^{q-1}$ can include one or more subclasses. Thus, the class history $C_{q-m+1}^{q-1}$ does not typically represent a unique string of m−1 classes, but rather a set of strings $\Lambda_{k_q-m+1}^{q-1}=\lambda_{k_q-m+1}\lambda_{k_q-m+2} \ldots \lambda_{k_q-1}$ each of length m−1. The probability $Pr(\lambda_{k_q}|C_{q-m+1}^{q-1}$ in expression (2) can be expressed in terms of individual subclasses as:

$$Pr\left(\lambda_{k_q} \,\middle|\, C_{q-m+1}^{q-1}\right) = \frac{\displaystyle\sum_{k_{q-1}=1}^{K_{q-1}} \sum_{k_{q-2}=1}^{K_{q-2}} \cdots \sum_{k_{q-m+1}=1}^{K_{q-m+1}} Pr\left(\lambda_{k_q} \,\middle|\, \Lambda_{k_{q-m+1}}^{k_{q-1}}\right) \cdot Pr\left(\lambda_{k_{q-1}} \,\middle|\, \Lambda_{k_{q-m+1}}^{k_{q-2}}\right) \cdots Pr\left(\lambda_{k_{q-m+2}} \,\middle|\, \lambda_{k_{q-m+1}}\right) \cdot Pr\left(\lambda_{k_{q-m+1}}\right)}{\displaystyle\sum_{k_{q-1}=1}^{K_{q-1}} \sum_{k_{q-2}=1}^{K_{q-2}} \cdots \sum_{k_{q-m+1}=1}^{K_{q-m+1}} Pr\left(\lambda_{k_{q-1}} \,\middle|\, \Lambda_{k_{q-m+1}}^{k_{q-2}}\right) \cdots Pr\left(\lambda_{k_{q-m+2}} \,\middle|\, \lambda_{k_{q-m+1}}\right) \cdot Pr\left(\lambda_{k_{q-m+1}}\right)} \tag{3}$$

Using expression (3), the probability $Pr(\lambda_{k_q}|C_{q-m+1}^{q-1})$ can be determined using a standard m-gram language model trained at the class level. Proof for expression (3) is described below in section 5 of the present disclosure.

As described above, it can be desirable to integrate the word n-gram model and the class m-gram model at a finer level of granularity. Since the word n-gram model can be expressed as (1) and the class m-gram model can be expressed as (2), it would be desirable to combine expressions (1) and (2) to obtain an integrated language model without utilizing arbitrarily interpolation or maximum entropy formulation. In order to achieve model integration at a finer level of granularity, expressions (1) and (2) can be integrated by means of joint probability. In particular, the joint probability of the current word $w_q$ and all its possible subclasses $c_q=\{\lambda_{k_q}\}$ given all relevant history can be computed as follows:

$$Pr(w_q c_q|W_{q-n+1}^{q-1}C_{q-m+1}^{q-1})=\sum_{k_q=1}^{K_q} Pr(w_q\lambda_{k_q}|W_{q-n+1}^{q-1}C_{q-m+1}^{q-1}) \tag{4}$$

Although expression (4) enables the word n-gram model and the class m-gram model to be integrated at a finer level of granularity, the right hand side of expression (4) can be challenging to evaluate due to its complexity. It can therefore be desirable to simplify the terms in the summation of $Pr(w_q\lambda_{k_q}|W_{q-n+1}^{q-1}C_{q-m+1}^{q-1})$ while implementing as few assumptions as possible with respect to the structure of the word and class history.

Using the definition of a conditional probability, $Pr(w_q\lambda_{k_q}|W_{q-n+1}^{q-1}C_{q-m+1}^{q-1})$ can be expressed as:

$$Pr(w_q\lambda_{k_q} \mid W_{q-n+1}^{q-1}C_{q-m+1}^{q-1}) = \frac{Pr(w_q\lambda_{k_q}W_{q-n+1}^{q-1}C_{q-m+1}^{q-1})}{Pr(W_{q-n+1}^{q-1}C_{q-m+1}^{q-1})} \tag{5}$$

By expanding the numerator and denominator of the right side of expression (5), $Pr(w_q\lambda_{k_q}|W_{q-n+1}^{q-1}C_{q-m+1}^{q-1}$ can be further expressed as:

$$Pr(w_q\lambda_{k_q} \mid W_{q-n+1}^{q-1}C_{q-m+1}^{q-1}) = \frac{Pr(\lambda_{k_q}C_{q-m+1}^{q-1} \mid w_qW_{q-n+1}^{q-1})\cdot Pr(w_q \mid W_{q-n+1}^{q-1})\cdot Pr(W_{q-n+1}^{q-1})}{Pr(C_{q-m+1}^{q-1} \mid W_{q-n+1}^{q-1})\cdot Pr(W_{q-n+1}^{q-1})}. \tag{6}$$

The term $Pr(W_{q-n+1}^{q-1})$ can be cancelled from the right side of expression (6) as follows:

$$Pr(w_q\lambda_{k_q} \mid W_{q-n+1}^{q-1}C_{q-m+1}^{q-1}) = \left[\frac{Pr(\lambda_{k_q}C_{q-m+1}^{q-1} \mid w_qW_{q-n+1}^{q-1})}{Pr(C_{q-m+1}^{q-1} \mid W_{q-n+1}^{q-1})}\right]\cdot Pr(w_q \mid W_{q-n+1}^{q-1}). \tag{7}$$

It should be appreciated that the right hand side of expression (7) comprises the standard word n-gram probability $Pr(w_q|W_{q-n+1}^{q-1})$ of (1) multiplied by the expression in square brackets which functions as a weight for the word n-gram probability $Pr(w_q|W_{q-n+1}^{q-1})$.

To simplify the expression in square brackets in expression (7), the numerator of the expression in square brackets can be expanded as follows:

$$Pr(\lambda_{k_q}C_{q-m+1}^{q-1})|W_{q-n+1}^{q-1}=Pr(\lambda_{k_q}|w_qW_{q-n+1}^{q-1})\cdot Pr(C_{q-m+1}^{q-1}|w_qW_{q-n+1}^{q-1}) \tag{8}$$

In the first term $Pr(\lambda_{k_q}|C_{q-m+1}^{q-1}w_qW_{q-n+1}^{q-1})$ on the right side of expression (8), the current subclass $\{\lambda_{k_q}\}$ can be conditioned on both the class history $C_{q-m+1}^{q-1}$ the word history $W_{q-n+1}^{q-1}$. To simplify expression (8), an assumption can be made that the class history $C_{q-m+1}^{q-1}$ is sufficient to evaluate $Pr(\lambda_{k_q}|C_{q-m+1}^{q-1}w_qW_{q-n+1}^{q-1})$ and that knowledge of the precise identity of the words $W_{q-n+1}^{q-1}$ is not necessary. In other words, it can be assumed that:

$$Pr(\lambda_{k_q}|C_{q-m+1}^{q-1}w_qW_{q-n+1}^{q-1})\approx Pr(\lambda_{k_q}|C_{q-m+1}^{q-1}w_q) \tag{9}$$

It should be appreciated that the assumption in expression (9) can be a relatively mild assumption since the dependence of the current subclass $\{\lambda_{k_q}\}$ on the word history $W_{q-n+1}^{q-1}$ can typically be weak. Thus, applying this assumption to the integrated model represented by expression (4) may not significantly impact the accuracy and robustness of the model.

In the second term $Pr(C_{q-m+1}^{q-1}|w_qW_{q-n+1}^{q-1})$ on the right side of expression (8), the class history $C_{q-m+1}^{q-1}$ can be conditioned on the word history $W_{q-n+1}^{q-1}$ as well as the current word $w_q$. Here, it can be assumed that the class history $W_{q-n+1}^{q-1}$ is sufficient to evaluate $Pr(C_{q-m+1}^{q-1}|w_qW_{q-n+1}^{q-1}$ and that knowledge of the current word $w_q$ is not necessary. In other words, it can be assumed that:

$$Pr(C_{q-m+1}^{q-1}|w_qW_{q-n+1}^{q-1})\approx Pr(C_{q-m+1}^{q-1}). \tag{10}$$

Similar to the assumption of expression (9), the assumption in expression (10) can also be a relatively mild assumption since the dependence of the class history $C_{q-m+1}^{q-1}$ on the current word $w_q$ can typically be weak. Thus, applying this assumption to the integrated model represented by expression (4) may also not significantly impact the accuracy and robustness of the model.

Applying the two assumptions of expressions (9) and (10) to expression (7), the term $Pr(C_{q-m+1}^{q-1}|W_{q-n+1}^{q-1})$ can be cancelled from both the numerator and denominator of expression (7) to thereby obtain the simplified expression of:

$$Pr(w_q\lambda_{k_q}|W_{q-n+1}^{q-1}C_{q-m+1}^{q-1})=Pr(\lambda_{k_q}C_{q-m+1}^{q-1}w_q)\cdot Pr(w_q|W_{q-n+1}^{q-1}) \tag{11}$$

The term $Pr(\lambda_{k_q}|C_{q-m+1}^{q-1}w_q)$ on the right side of expression (11) can be expanded using Bayes' rule as follows:

$$Pr(\lambda_{k_q} \mid C_{q-m+1}^{q-1}w_q) = \frac{Pr(w_q \mid \lambda_{k_q}C_{q-m+1}^{q-1})\cdot Pr(\lambda_{k_q} \mid C_{q-m+1}^{q-1})}{Pr(w_q)}. \tag{12}$$

The right side of expression (11) can be further simplified by assuming that the probability of the current word $w_q$ given the current subclass $\lambda_{k_q}$ (also known as the class assignment probability) does not depend on the class history $C_{q-m+1}^{q-1}$. In other words, it can be assumed that:

$$Pr(w_q|\lambda_{k_q}C_{q-m+1}^{q-1})\approx Pr(w_q|\lambda_{k_q}). \tag{13}$$

The assumption of expression (13) can also be a relatively mild assumption since the dependence of the current word $w_q$ on the class history $C_{q-m+1}^{q-1}$ can typically be weak.

By applying expressions (12) and (13) to expressions (11), expression (11) becomes:

$$Pr(w_q\lambda_{k_q} \mid W_{q-n+1}^{q-1}C_{q-m+1}^{q-1}) = \left[\frac{Pr(w_q \mid \lambda_{k_q})\cdot Pr(\lambda_{k_q} \mid C_{q-m+1}^{q-1})}{Pr(w_q)}\right]\cdot Pr(w_q \mid W_{q-n+1}^{q-1}). \tag{14}$$

It should be appreciated that only the numerator of the expression within square brackets on the right side of expression (14) depends on the current subclass $\lambda_{k_q}$. Thus, the summation of expression (4) only needs to be applied to the numerator of this expression within square brackets. Accordingly, expression (14) can be combined with expression (4) as follows:

$$Pr(w_qc_q \mid W_{q-n+1}^{q-1}C_{q-m+1}^{q-1}) = \left[\frac{\sum_{k_q=1}^{K_q} Pr(w_q \mid \lambda_{k_q})\cdot Pr(\lambda_{k_q} \mid C_{q-m+1}^{q-1})}{Pr(w_q)}\right]\cdot Pr(w_q \mid W_{q-n+1}^{q-1}). \tag{15}$$

It should be recognized that the numerator of the expression in brackets on the right side of expression (15) is identical to the right side of expression (2). Expression (2) can thus be applied to expression (15) to arrive at the following:

$$Pr(w_q c_q \mid W_{q-n+1}^{q-1} C_{q-m+1}^{q-1}) = \left[\frac{Pr(w_q \mid C_{q-m+1}^{q-1})}{Pr(w_q)}\right] \cdot Pr(w_q \mid W_{q-n+1}^{q-1}). \tag{16}$$

Expression (16) can be a simplification of expression (4) after implementing the assumptions of expressions (9), (10) and (13). Therefore, expression (16) can be a simplified expression of the integrated word n-gram and class m-gram model represented by expression (4). The integrated word n-gram and class m-gram model of expression (16) can incorporate information from the class m-gram model that is relative to a word unigram with no class information. In particular, as shown in expression (16), the word n-gram probability $Pr(w_q|W_{q-n+1}^{q-1})$ can be modified by the weight expression $$\left[\frac{Pr(w_q \mid C_{q-m+1}^{q-1})}{Pr(w_q)}\right]$$

that includes the class m-gram probability $Pr(W_{q-m+1}^{q-1})$ and the word unigram probability $Pr(w_q)$. The weight expression $$\left[\frac{Pr(w_q \mid C_{q-m+1}^{q-1})}{Pr(w_q)}\right]$$

can be proportional to the class m-gram probability $Pr(w_q|C_{q-m+1}^{q-1})$ and inversely proportional to the word unigram probability $Pr(w_q)$. Thus, if the class m-gram model predicts that probability $Pr(w_q|C_{q-m+1}^{q-1})$ of the current word $w_q$ is higher than that predicted using only word unigram information $Pr(w_q)$, then the word n-gram probability $Pr(w_q|W_{q-n+1}^{q-1})$ can be enhanced by the weight expression. On the other hand, if the word unigram model predicts that the probability $Pr(w_q)$ of the current word is higher than that predicted by the class m-gram model $Pr(w_q|C_{q-m+1}^{q-1})$ the word n-gram probability $Pr(w_q|W_{q-n+1}^{q-1})$ can be reduced by the weight expression.

It should be appreciated that the weight expression $$\left[\frac{Pr(w_q \mid C_{q-m+1}^{q-1})}{Pr(w_q)}\right]$$

in expression (16) enables the word n-gram probability $Pr(w_q|W_{q-n+1}^{q-1})$ to be adjusted based on the local context observed. In particular, for a current word $w_q$ that occurs frequently in a training corpus, the word unigram probability $Pr(w_q)$ can tend to be large, thereby limiting the influence of the class m-gram probability $Pr(w_q|C_{q-m+1}^{q-1})$ in favor of the word n-gram probability $Pr(w_q|W_{q-n+1}^{q-1})$. On the other hand, for a current word $w_q$ that rarely occurs in a training corpus, the word unigram probability $Pr(w_q)$ can tend to be small, thereby enhancing the influence of the class m-gram probability $Pr(w_q|C_{q-m+1}^{q-1})$ relative to the word n-gram probability $Pr(w_q|W_{q-n+1}^{q-1})$. Thus, in expression (16) the word n-gram model and the class m-gram model can be integrated locally based on the frequency of occurrence of the current word $w_q$ in a training corpus, rather than globally based on rigid interpolation or maximum entropy formulation. This results in a more accurate and robust language model.

In some examples, the integrated language model represented by expression (16) can be utilized to disambiguate discourse inputs. For example, discourse input can be received by an electronic device in the form of speech or handwriting input. Due to the inherent background noise and inaccuracies associated with such discourse inputting means, a robust language model can be utilized to disambiguate the discourse inputs. Specifically, a robust language model can be utilized to determine the most likely sequence of words represented by the speech or handwriting input. In other examples, the integrated model represented by expression (16) can be utilized as a robust language model for predicting text. In particular, based on a string of words inputted by a user, a predicted word can be generated using the robust language model. In some examples, the integrated language model represented by expression (16) can be implemented in the digital assistant system 300, described above. Specifically, the integrated language model of expression (16) can be a language model implemented by the STT processing module 330 of the digital assistant. Exemplary processes (e.g., processes 400, 500, 600, and 700) for using the integrated model represented by expression (16) for disambiguating discourse inputs and text prediction are described in greater detail below.

5. Probability $Pr(\lambda_{k_q}|C_{q-m+1}^{q-1})$ of a Specific Subclass Given the Class History Referring back to expression (3) described above, it can be shown by induction on m, which is the order of a standard m-gram model trained at the class level, that the probability $Pr(\lambda_{k_q}|C_{q-m+1}^{q-1})$ can be expressed according to expression (3). For example, considering m=2, the probability $Pr(\lambda_{k_q}|C_{q-m+1}^{q-1})$ can be reduced to $Pr(\lambda_{k_q}|c_{q-1})$, where $c_{q-1}$ can take values from a small set of subclasses $\{\lambda_{k_{q-1}}\}$, $1 \le k_{q-1} \le K_{q-1}$. Accordingly, $Pr(\lambda_{k_q}|c_{q-1})$ can be expressed as follows:

$$Pr(\lambda_{k_q} \mid c_{q-1}) = \frac{Pr(\lambda_{k_q} \mid c_{q-1})}{Pr(c_{q-1})} = \frac{\frac{1}{K_{q-1}} \sum_{k_{q-1}=1}^{K_{q-1}} Pr(\lambda_{k_q} \lambda_{k_{q-1}})}{\frac{1}{K_{q-1}} \sum_{k_{q-1}=1}^{K_{q-1}} Pr(\lambda_{k_{q-1}})}. \tag{17}$$

After canceling out the term $$\frac{1}{K_{q-1}}$$

in both the numerator and denominator of the right side of expression (17), expression (18) below can be obtained, which verifies expression (3).

$$Pr(\lambda_{k_q} \mid c_{q-1}) = \frac{\sum_{k_{q-1}=1}^{K_{q-1}} Pr(\lambda_{k_q} \mid \lambda_{k_{q-1}}) \cdot Pr(\lambda_{k_{q-1}})}{\sum_{k_{q-1}=1}^{K_{q-1}} Pr(\lambda_{k_{q-1}})} \tag{18}$$

Next, assuming that expression (3) holds at order m, we consider whether expression (3) holds at order m+1. At order m+1:

$$Pr(\lambda_{k_q}|C_{q-m+1}{}^{q-1}=Pr(\lambda_{k_q}|C_{q-m+1}{}^{q-1}), \tag{19}$$

where $c_{q-m}$ can take values from a small set of subclasses $\{\lambda_{k_{q-m}}\}$, $1 \leq k_{q-m} \leq K_{q-m}$ Accordingly, $Pr(\lambda_{k_q}|C_{q-m}{}^{q-1})$ can be expressed as follows:

$$Pr(\lambda_{k_q} \mid C_{q-m}^{q-1}) = \frac{Pr(\lambda_{k_q} C_{q-m+1}^{q-1} c_{q-m})}{Pr(C_{q-m+1}^{q-1} c_{q-m})} = \frac{\frac{1}{K_{q-m}} \sum_{k_{q-m}=1}^{K_{q-m}} Pr(\lambda_{k_q} C_{q-m+1}^{q-1} \lambda_{k_{q-m}})}{\frac{1}{K_{q-m}} \sum_{k_{q-m}=1}^{K_{q-m}} Pr(C_{q-m+1}^{q-1} \lambda_{k_{q-m}})}. \tag{20}$$

After canceling out the term $$\frac{1}{K_{q-m}}$$

in both numerator and denominator of expression (18), the following expression can be obtained:

$$Pr(\lambda_{k_q} \mid C_{q-m}^{q-1}) - \frac{\sum_{k_{q-m}=1}^{K_{q-m}} Pr(\lambda_{k_q} C_{q-m+1}^{q-1} \mid \lambda_{k_{q-m}}) \cdot Pr(\lambda_{k_{q-m}})}{\sum_{k_{q-m}=1}^{K_{q-m}} Pr(C_{q-m+1}^{q-1} \mid \lambda_{k_{q-m}}) \cdot Pr(\lambda_{k_{q-m}})}. \tag{21}$$

It should be recognized that when the terms involving $\lambda_{k_q} C_{q-m+1}{}^{q-1}$ and $C_{q-m+1}{}^{q-1}$ are expanded, expression (19) can corresponds to expression (3) at order m+1. Accordingly, expression (3) is proven by induction.

6. Process for Processing Discourse Input

FIGS. 4-7 illustrate processes 400, 500, 600, and 700 for processing discourse input according to various examples. Processes 400, 500, 600, and 700 can be performed at an electronic device with one or more processors and memory storing one or more programs for execution by the one or more processors. In some examples, the process 400 can be performed at the user device 104 or the server system 108. In some examples, the process 400 can be performed by the digital assistant system 300 (FIG. 3A), which, as described above, may be implemented on a standalone computer system (e.g., either the user device 104 or the server system 108) or distributed across multiple computers (e.g., the user device 104, the server system 108, and/or additional or alternative devices or systems). While the following discussion describes the processes 400, 500, 600, and 700 as being performed by an electronic device, the process is not limited to performance by any particular device, combination of devices, or implementation. Moreover, the individual blocks of the processes may be distributed among the one or more computers, systems, or devices in any appropriate manner.

Figure 4:
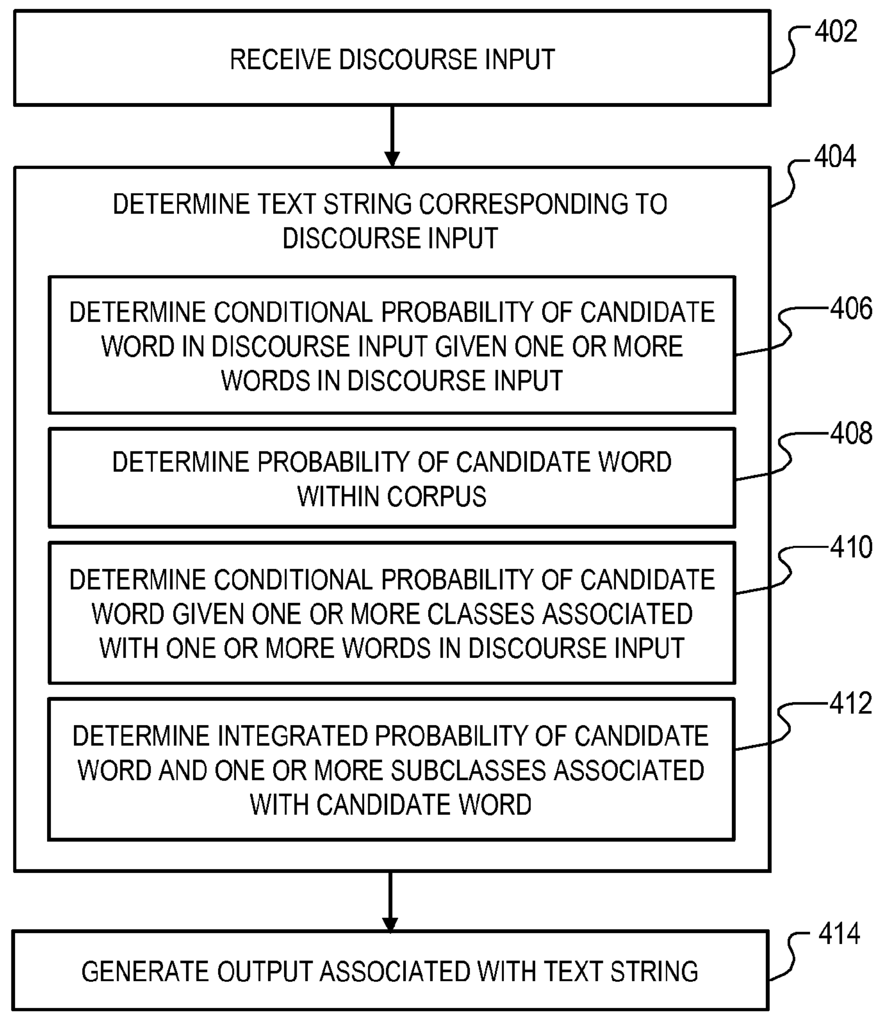
FIG. 4 illustrates a process for processing discourse input according to various examples.
Figure 5:
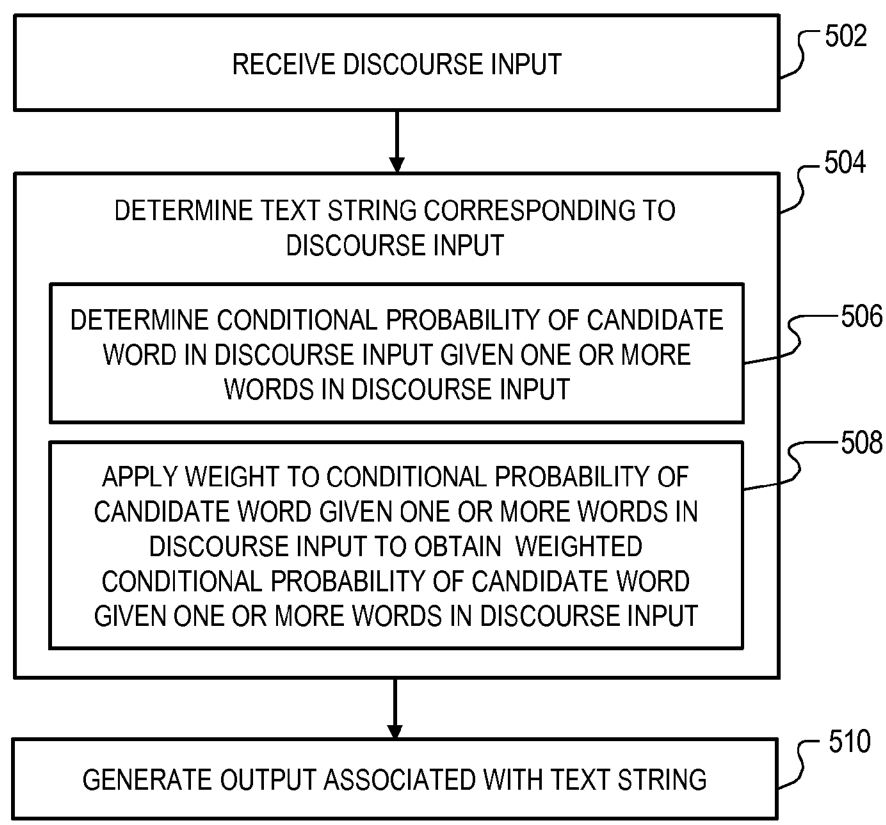
FIG. 5 illustrates a process for processing discourse input according to various examples.

Referring to FIGS. 4 and 5, processes 400 and 500 can be suitable for processing discourse inputs, such as speech input, handwriting input, text translation input, and the like, to determine a text string corresponding to the discourse input. The text string can be determined using one or more language models. For example, the integrated language model represented by expression (16) can be used to accurately determine the text string corresponding to the discourse input.

At block 402 of process 400, a discourse input can be received from a user. The discourse input can include a string of words. Each word $w_i$ of the string of words can be associated with a class $c_i$. Further, each class $c_i$ can include one or more subclasses $\lambda_{k_q}$. A subclass $\lambda_{k_q}$ can be any predetermined category for classifying the word $w_i$. For example, the string of words of the discourse input can include the word "book," which can be associated with a class. The class with which the word "book" is associated can include the subclasses: {noun}, {adjective}, and {verb}.

In some examples, the discourse input can be a speech input that is received in the course of, or as part of, an interaction with a digital assistant (e.g., the digital assistant implemented on the digital assistant system 300). The speech input can be received in the form of sound waves, an audio file, or a representative audio signal (analog or digital). The speech input can include a string of words in spoken form. In some examples, the speech input can be sound waves that are received by the microphone (e.g., microphone 230) of the electronic device. In other examples, the speech input can be a representative audio signal or a recorded audio file that is received by the audio subsystem (e.g., audio subsystem 226), the peripheral interface (e.g., peripheral interface 206), or the processor (e.g., processor 204) of the electronic device. In yet other examples, the speech input can be a representative audio signal or a recorded audio file that is received by the I/O interface (e.g., I/O interface 306) or the processor (e.g., processor 304) of the digital assistant system.

It should be appreciated that the discourse input can be various other forms of input that represent a string of words of a language. For instance, in some examples, the discourse input can be handwriting input that includes a string of words in handwritten form. The handwriting input can be received from a user via a handwriting recognition interface (e.g., a handwriting recognition interface displayed on the touchscreen 246) of the electronic device. In other examples, the discourse input can be in the form of physical gestures or expressions received via an optical sensor (e.g., optical sensor 222) of the electronic device. In one such example, the discourse input can include a string of words expressed in the form of sign language and received via the optical sensor of the electronic device. In yet other examples, the discourse input can be a text input of a first language that includes a string of words. In these examples, the text input can be received via an interface (e.g., a virtual keyboard displayed on touchscreen 246 or other input/control devices 248). The interface can be any suitable interface of the electronic device for inputting text, such as, for example, the interface can be a keyboard/keypad, a touch screen implementing a virtual keyboard, a remote control (e.g., television remote control), a scroll wheel interface, an audio input interface implementing speech-to-text conversion, and the like.

At block 404 of process 400, a text string corresponding to the discourse input can be determined. In examples where the discourse input is a speech input, the speech input can be processed using an ASR system (e.g., the ASR system of STT processing module 330) of the digital assistant to determine the text string corresponding to the speech input. As described above, representative features can be extracted from the speech input using a front-end speech pre-processor of the ASR system. Further, using speech recognition models and speech recognition engines of the ASR system, intermediate recognition results (e.g., phonemes, sequence of phonemes, and sub-words) can be determined from the extracted representative features and the text string corresponding to the speech input can then be determined from the intermediate recognition results.

For discourse inputs of other forms, such as handwriting input, gesture input, and the like, the text string corresponding to the discourse input can be determined using the discourse input processing module (e.g., discourse input processing module 358) of the electronic device. Further, in examples where the discourse input is a text input of a first language, the text string determined at block 404 can be a text string of a second language corresponding to the text input of the first language. The text string of the second language can be determined from the text input of the first language using a text translation module (e.g., text translation module 362) of the electronic device.

The text string at block 404 can be determined using one or more language models (e.g., language models 333). The one or more language models can serve to disambiguate uncertainty that is inherent in, for example, speech recognition, handwriting recognition, gesture recognition, and machine translation. The text string having the highest likelihood of corresponding to the discourse input can thus be determined using the one or more language models. As shown in FIG. 4, block 404 can include blocks 406 through 410, which describe the use of an integrated word n-gram and class m-gram language model to determine the text string corresponding to the discourse input. In particular, in some examples, the use of the integrated language model represented by expression (16) can enable greater accuracy and robustness in determining the text string at block 404.

At block 406 of process 400, a conditional probability of a candidate word in the discourse input given one or more words in the discourse input can be determined using a first language model. The first language model can be stored (e.g., in the language models 333) on the electronic device. The conditional probability of the candidate word in the discourse input given the one or more words in the discourse input can be expressed as $\Pr(w_q|W_{q-n+1}^{q-1})$. In process 400 (and similarly process 500), $w_q$ can refer to the candidate word and $W_{q-n+1}^{q-1}$ can refer to the one or more words in the discourse input. In some examples, the one or more words can be the word history preceding the candidate word in the discourse input. In some examples, the first language model can be a word n-gram language model. Thus, the conditional probability $\Pr(w_q|W_{q-n+1}^{q-1})$ of the candidate word in the discourse input given the one or more words in the discourse input can be determined using a word n-gram language model.

At block 408 of process 400, a probability of the candidate word within a corpus can be determined using a second language model. The second language model can be trained using the corpus. Thus, the probability of the candidate word within the corpus can represent the frequency of occurrence of the candidate word within the corpus used to train the second language model. The probability of the candidate word within the corpus can be expressed as $\Pr(w_q)$. In some examples, the second language model can be a word n-gram language model. In some examples, the second language model can be the same language model as the first language model used to determine the conditional probability at block 406. In other examples, the second language model can be a word unigram language model. The second language model can be stored (e.g., in language models 333) of the electronic device.

At block 410 of process 400, a conditional probability of the candidate word given one or more classes associated with the one or more words can be determined using a third language model. The conditional probability of the candidate word given one or more classes associated with the one or more words can be expressed as $\Pr(w_q|C_{q-m+1}^{q-1})$, where $w_q$ can be the candidate word and $C_{q-m+1}^{q-1}$ can be the one or more classes associated with the one or more words $W_{q-n+1}^{q-1}$ the discourse input. In some examples, the one or more classes $C_{q-m+1}^{q-1}$ can be the class history corresponding to the word history $W_{q-n+1}^{q-1}$ preceding the candidate word $w_q$. In some examples, third language model can be a class m-gram language model. The third language model can be stored (e.g., in language models 333) of the electronic device. The conditional probability $\Pr(w_q|W_{q-n+1}^{q-1})$ of the candidate word in the discourse input given the one or more words in the discourse input can be determined using a class m-gram language model.

As described above, a class $c_i$, of the one or more classes $C_{q-m+1}^{q-1}$ can include one or more subclasses $\lambda_{k_q}$. Because each class $c_i$, of the one or more classes $C_{q-m+1}^{q-1}$ can include one or more subclasses $\lambda_{k_q}$, the one or more classes $C_{q-m+1}^{q-1}$ can comprise a set of strings of subclasses $\Lambda_{k_q-m+1}^{k_q-1}=\lambda_{k_q-m+1}\lambda_{k_q-m+2}\ldots\lambda_{k_q-1}$ each of length m−1, where m−1 can be the number of words in the one or more words.

At block 412 of process 400, an integrated probability of the candidate word and one or more subclasses associated with the candidate word can be determined based on the conditional probability of the candidate word given the one or more words, the probability of the candidate word within the corpus, and the conditional probability of the candidate word given the one or more classes. In some examples, the integrated probability can be determined using expression (16). In these examples, the integrated probability can be the joint probability of the candidate word $w_q$ and the one or more subclasses $c_q=\{\lambda_{k_q}\}$ associated with the candidate word $w_q$ given the one or more words $W_{q-n+1}^{q-1}$ and the one or more classes $C_{q-m+1}^{q-1}$. The integrated probability can thus be determined by solving the right side of expression (16) using the conditional probability $\Pr(w_q|W_{q-n+1}^{q-1})$ of the candidate word given the one or more words determined at block 406, the probability $\Pr(w_q)$ of the candidate word within the corpus determined at block 408, and the conditional probability $\Pr(w_q|C_{q-m+1}^{q-1})$ of the candidate word given the one or more classes determined at block 410.

As described above, expression (16) was derived by applying several assumptions to simplify the expression. In examples where the integrated probability of block 412 is determined using expression (16), the assumption used to derive expression (16) can be inherent to the integrated probability. In particular, with reference to expression (9), it can be assumed that knowledge of the precise identity of the one or more words $W_{q-n+1}^{q-1}$ is not necessary to determine $\Pr(\lambda_{k_q}|w_q W_{q-n+1}^{q-1})$. Thus, the integrated probability at block 412 can be based on the assumption that the conditional probability $\Pr(\lambda_{k_q}|C_{q-m+1}^{q-1}\ W_{q-n+1}^{q-1})$ of a subclass associated with the candidate word given the candidate word, the one or more words, and the one or more classes is equal to the conditional probability $\Pr(\lambda_{k_q}|C_{q-m+1}^{q-1}\ w_q)$ of the subclass of the class associated with the candidate class given the candidate word and the one or more classes.

In addition, with reference to expression (10), it can be assumed that knowledge of the candidate word $w_q$ is not necessary to determine $\Pr(C_{q-m+1}^{q-1}|w_q W_{q-n+1}^{q-1})$. Thus, the integrated probability at block 412 can be based on assuming that the conditional probability $\Pr(C_{q-m+1}^{q-1}|w_q$ $W_{q-n+1}^{q-1}$) of the one or more classes given the candidate word and the one or more words is equal to a conditional probability $Pr(C_{q-m+1}^{q-1}|W_{q-n+1}^{q-1})$ of the one or more classes given the one or more words.

Further, with reference to expression (13), it can be assumed that the probability $Pr(w_q|\lambda_{k_q}C_{q-m+1}^{q-1})$ of the current word $w_q$ given the current class $\lambda_{k_q}$ does not depend on the class history $C_{q-m+1}^{q-1}$. Thus, the integrated probability at block 412 can be based on assuming that the conditional probability $Pr(w_q|\lambda_{k_q}C_{q-m+1}^{q-1})$ of the candidate word given the subclass associated with the candidate class and the one or more classes is equal to the conditional probability $Pr(w_q|\lambda_{k_q})$ of the candidate word given the subclass associated with the candidate word.

As described above, the expression $$\left[\frac{Pr(w_q \mid C_{q-m+1}^{q-1})}{Pr(w_q)}\right]$$

on the right side of expression (16) can function as a weight that modifies $Pr(w_q|W_{q-n+1}^{q-1})$. Therefore, in examples where the integrated probability is determined using expression (16), the value of the integrated probability $Pr(w_qc_q|W_{q-n+1}^{q-1}C_{q-m+1}^{q-1})$ relative to the conditional probability $Pr(w_q|W_{q-n+1}^{q-1})$ of the candidate word given the one or more words can depend on the value of the expression $$\left[\frac{Pr(w_q \mid C_{q-m+1}^{q-1})}{Pr(w_q)}\right].$$

When the conditional probability $Pr(w_q|C_{q-m+1}^{q-1})$ of the candidate word given the one or more classes is greater than the probability $Pr(w_q)$ of the candidate word within the corpus, the expression $$\left[\frac{Pr(w_q \mid C_{q-m+1}^{q-1})}{Pr(w_q)}\right]$$

can be greater than one and thus the integrated probability $Pr(w_qc_q|W_{q-n+1}^{q-1}C_{q-m+1}^{q-1})$ can be greater than the conditional probability $Pr(w_q|C_{q-m+1}^{q-1})$ of the candidate word given the one or more words. However, when the conditional probability $Pr(w_q|C_{q-m+1}^{q-1})$ of the candidate word given the one or more classes is less than the probability $Pr(w_q)$ of the candidate word within the corpus, the expression $$\left[\frac{Pr(w_q \mid C_{q-m+1}^{q-1})}{Pr(w_q)}\right]$$

can be less than one and thus the integrated probability $Pr(w_qc_q|W_{q-n+1}^{q-1}C_{q-m+1}^{q-1})$ can be greater than the conditional probability $Pr(w_q|C_{q-m+1}^{q-1})$ of the candidate word given the one or more words.

$$\left[\frac{Pr(w_q \mid C_{q-m+1}^{q-1})}{Pr(w_q)}\right]$$

Further, based on the expression on the right side of expression (16), it can be appreciated that the contribution of the conditional probability $Pr(w_qC_{q-m+1}^{q-1})$ of the candidate word given the one or more words to the integrated probability $Pr(w_qc_q|W_{q-n+1}^{q-1}C_{q-m+1}^{q-1})$ can be based on the probability $Pr(w_q)$ of the candidate word within the corpus. In particular, as the probability $Pr(w_q)$ of the candidate word within the corpus increases, the conditional probability $Pr(w_q|C_{q-m+1}^{q-1})$ of the candidate word given the one or more words in the expression $$\left[\frac{Pr(w_q \mid C_{q-m+1}^{q-1})}{Pr(w_q)}\right]$$

can be divided by a larger value. Thus, the contribution of the conditional probability $Pr(w_q|C_{q-m+1}^{q-1})$ of the candidate word given the one or more words to the integrated probability $Pr(w_qc_q|W_{q-n+1}^{q-1}C_{q-m+1}^{q-1})$ decreases. Accordingly, the integrated probability $Pr(W_qc_q|W_{q-n+1}^{q-1}C_{q-m+1}^{q-1})$ can be less dependent on the conditional probability $Pr(w_qc_q|W_{q-n+1}^{q-1}C_{q-m+1}^{q-1})$ of the candidate word given the one or more classes when the probability $Pr(w_q)$ of the candidate word within the corpus is higher than when the probability $Pr(w_q)$ of the candidate word within the corpus is lower.

Referring back to block 404, the integrated probability determined at blocks 406 through 412 can be used to determine the text string corresponding to the discourse input. For example, the integrated probability determined at block 412 can be used to determine the candidate word with the highest likelihood. In this way, the text string having the highest likelihood of corresponding to the discourse input can be determined based on the integrated probability determined at block 412.

At block 414 of process 400, an output based on the text string can be generated. In some example, the text string corresponding to the discourse input can contain a user request. The natural language processor (e.g., natural language processing module 332), the dialogue flow processing module (e.g., dialogue flow processing module 334), the task flow processing module (e.g., task flow processing module 336), and the service processing module (e.g., service processing module 338) of the digital assistant can be used to infer the user's intent based on the text string and generate an appropriate output that is responsive to the user request. In a specific example, the text string corresponding to the discourse input can include the request, "Find me a sushi restaurant." Based on this text string, the actionable intent of "find restaurant" can be determined using the natural language processor. The task flow processing module and the service processing module can then perform the tasks associated with the actionable intent of "find restaurant." In particular, the task flow processing module and the service processing module can invoke a search of sushi restaurants within the locality of the user and displaying the results of the search on the electronic device. Thus, in this example, generating the output based on the text string can include displaying (e.g., on the touch screen 246) the results of the restaurant search on the electronic device.

It should be recognized that in other examples, the generated output can include any output generated by the electronic device that is responsive to the discourse input. For instance, in some examples, the generated output can comprise the display of the text string on the electronic device. Specifically, the text string can be displayed on the electronic device for applications involving speech recognition, handwriting recognition, gesture recognition and the like. Further, in machine translation applications, the text string in the translated language can be displayed on the electronic device. In other examples, the generated output can include speech, music, or video output that is responsive to the discourse input. In yet other examples, the generated output can include data (e.g., email, text, files, etc.) sent from the electronic device that is responsive to the discourse input.

Referring now to FIG. 5, process 500 can be similar to process 400, described above. At block 502 of process 500, a discourse input can be received from a user. The discourse input can include a string of words. Block 502 can be similar or identical to block 402 of process 400, described above.

At block 504 of process 500, a text string corresponding to the discourse input can be determined. Block 504 can be similar to block 404 of process 400, except that block 508 substitutes blocks 408 through 412. The text string can be determined using one or more language models. In particular, as described in blocks 506 and 508, a weighted conditional probability of a candidate word in the discourse input given one or more words in the discourse input can be determined using one or more language models. In some examples, the weighted conditional probability can be determined using expression (16), described above. The text string corresponding to the discourse input can then be determined based on the weighted conditional probability.

At block 506 of process 500, a conditional probability of the candidate word in the discourse input given the one or more words in the discourse input can be determined using a first language model. Block 506 can be similar or identical to block 406 of process 400, described above. The conditional probability of the candidate word in the discourse input given one or more words in the discourse input can be expressed as $Pr(w_q|W_{q-n+1}^{q-1})$, where $w_q$ can be the candidate word and $W_{q-n+1}^{q-1}$ can be the one or more words in the discourse input. In some examples, the one or more words can be the word history preceding the candidate word in the discourse input. In some examples, the first language model can be a word n-gram language model.

At block 508 of process 500, a weight can be applied to the conditional probability of the candidate word given the one or more words to obtain a weighted conditional probability of the candidate word given the one or more words. In some examples, the weight can be based on a conditional probability of the candidate word given one or more classes associated with the one or more words. Further, in some examples, the weight can be based on a probability of the candidate word within a corpus.

In some examples, the weighted conditional probability can be determined using expression (16), described above. In these examples, the applied weight can be the expression $$\left[\frac{Pr(w_q \mid C_{q-m+1}^{q-1})}{Pr(w_q)}\right].$$

As shown in expression (16), the weight $$\left[\frac{Pr(w_q \mid C_{q-m+1}^{q-1})}{Pr(w_q)}\right]$$

can be applied to the conditional probability $Pr(w_q|W_{q-n+1}^{q-1})$ of the candidate word given the one or more words by means of a dot product operation to obtain the weighted conditional probability. The weighted conditional probability can refer to the joint probability $Pr(w_q c_q|W_{q-n+1}^{q-1}C_{q-m+1}^{q-1})$ of the candidate word $w_q$ and one or more subclasses $c_q=\{\lambda_{k_q}\}$ associated with the candidate word $w_q$ given the one or more words $W_{q-n+1}^{q-1}$ and the one or more classes $C_{q-m+1}^{q-1}$, as expressed on the left side of expression (16).

With respect to the weight $$\left[\frac{Pr(w_q \mid C_{q-m+1}^{q-1})}{Pr(w_q)}\right],$$

$Pr(w_q|C_{q-m+1}^{q-1})$ can be the conditional probability of the candidate word $w_q$ given the one or more classes $C_{q-m+1}^{q-1}$ associated with the one or more words $W_{q-n+1}^{q-1}$ and $Pr(w_q)$ can be the probability of the candidate word within a corpus. In some examples, block 504 can include determining the probability $Pr(w_q)$ of the candidate word $w_q$ within a corpus using a second language model. The second language model can be trained using the corpus. In some examples, the second language model can be a word unigram language model. In other examples, the second language model can be a word n-gram language model. In yet other examples, the second language model can be the same language model as the first language model used in block 506. Further, in some examples, block 504 can include determining the conditional probability $Pr(w_q|C_{q-m+1}^{q-1})$ of the candidate word $w_q$ given the one or more classes $C_{q-m+1}^{q-1}$ associated with the one or more words $W_{q-n+1}^{q-1}$ using a third language model. In some examples, the third language model can be a class m-gram language model. As described above, a class $c_i$ of the one or more classes $C_{q-m+1}^{q-1}$ can include one or more subclasses $\lambda_{k_q}$.

In examples where expression (16) is implemented to obtain the weighted conditional probability of block 508, the weighted conditional probability of the candidate word can be proportional to the conditional probability $Pr(w_q|C_{q-m+1}^{q-1})$ of the candidate word given the one or more words. Further, the weight $$\left[\frac{Pr(w_q \mid C_{q-m+1}^{q-1})}{Pr(w_q)}\right]$$

can be proportional to the conditional probability $Pr(w_q|C_{q-m+1}^{q-1})$ of the candidate word given the one or more classes and inversely proportional to the probability $Pr(w_q)$ of the candidate word within the corpus.

Based on the applied weight $$\left[\frac{Pr(w_q \mid C_{q-m+1}^{q-1})}{Pr(w_q)}\right],$$

the weighted conditional probability can be greater than the conditional probability $Pr(w_q W_{q-n+1}^{q-1})$ of the candidate word given the one or more words when the conditional probability $Pr(w_q)$ of the candidate word given the one or more classes is greater than the probability $Pr(w_q)$ of the candidate word within the corpus. Conversely, the weighted conditional probability can be less than the conditional probability $Pr(w_q|W_{q-n+1}^{q-1})$ of the candidate word given the one or more words when the conditional probability $\Pr(w_q|C_{q-m+1}^{q-1})$ of the candidate word given the one or more classes is less than the probability $\Pr(w_q)$ of the candidate word within the corpus.

In examples where the weighted conditional probability is determined using expression (16), the weighted conditional probability can be based on the same assumptions used to derive expression (16). In particular, the weighted conditional probability can be based on similar or identical assumptions as described above with respect to the integrated probability at block 412.

At block 510 of process 500, an output can be generated based on the text string. Block 510 can be similar or identical to block 418 of process 400, described above.

Figure 6:
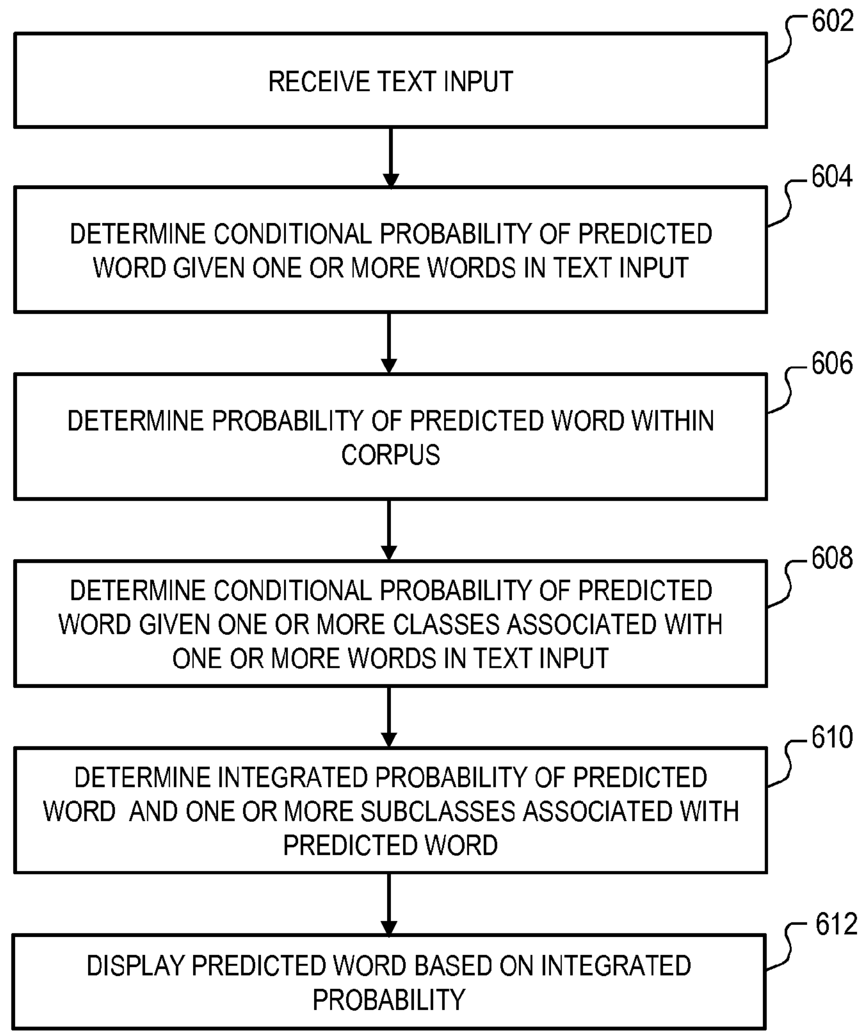
FIG. 6 illustrates a process for processing discourse input according to various examples.
Figure 7:
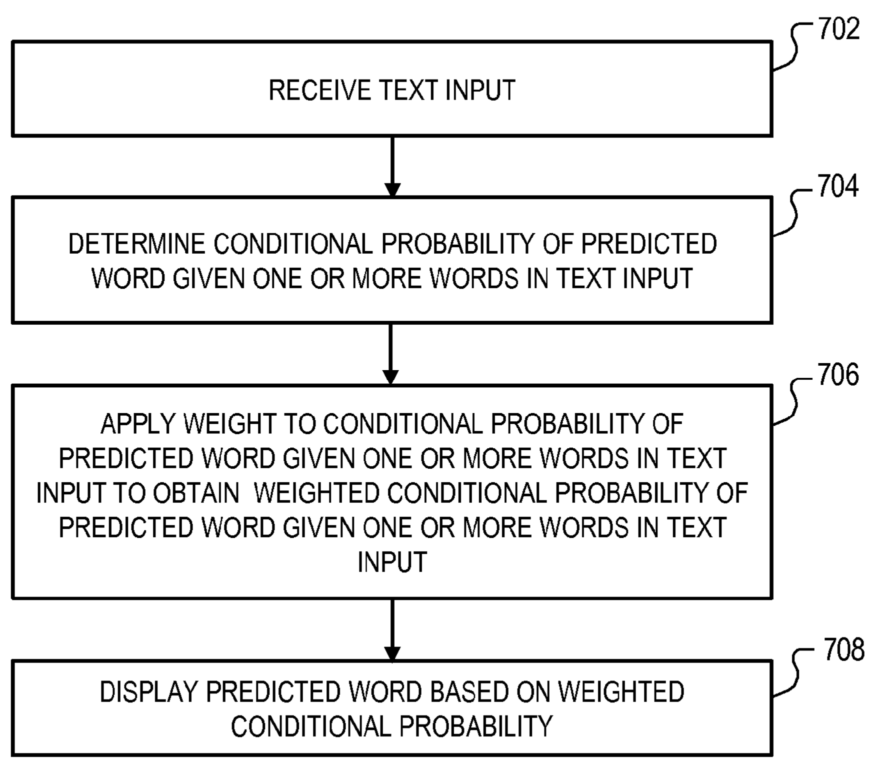
FIG. 7 illustrates a process for processing discourse input according to various examples.

Referring to FIGS. 6 and 7, processes 600 and 700 can be suitable for processing discourse input, such as text input, to determine a predicted word. The predicted word can be determined using one or more language models. For example, the integrated language model represented by expression (16) can be used to accurately determine a predicted word based on one or more words in the text input.

At block 602 of process 600, a text input can be received from a user. In some examples, the text input can be received via an interface of the electronic device (e.g., touch screen 246 or other input/control devices 248 of user device 200). The interface can be any suitable device for inputting text. For example, the interface can be a keyboard/keypad, a touch screen implementing a virtual keyboard, a remote control (e.g., television remote control), a scroll wheel interface, an audio input interface implementing speech-to-text conversion, a handwriting recognition interface implementing handwriting-to-text conversion, or the like. The received text input can be in any language and can include one or more words. For example, the text input can be a sequence of words. In some cases, a character (e.g., symbols and punctuation) can be considered a word.

At block 604 of process 600, a conditional probability of a predicted word given one or more words in the text input can be determined using a first language model. The first language model can be stored (e.g., in the language models 333) on the electronic device. In some example, the first language model can be a word n-gram language model. The conditional probability of the predicted word given the one or more words in the text input can be expressed as $\Pr(w_q|W_{q-n+1}^{q-1})$. In process 600 (and similarly process 700), $w_q$ can refer to the predicted word and $W_{q-n+1}^{q-1}$ can refer to the one or more words in the text input. In some examples, the predicted word $w_q$ can be a word that is predicted to succeed the one or more words of the text input. In a specific example, the one or more words of the text input can be "once upon a" and the predicted word can be "time." Block 604 (and similarly blocks 606, 608, and 610, described below) can be performed by a text prediction module of the electronic device.

At block 606 of process 600, a probability of the predicted word $w_q$ within a corpus can be determined using a second language model. The second language model can be trained using the corpus. The second language model can be stored (e.g., in the language models 333) on the electronic device. In some examples, the second language model can be a word n-gram model. In one such example, the second language model can be the same language model as the first language model used to determine the conditional probability of the predicted word at block 604. In other examples, the second language model can be a word unigram language model. The probability of the predicted word within the corpus can be expressed as $\Pr(w_q)$.

At block 608 of process 600, a conditional probability of the predicted word given one or more classes associated with the one or more words can be determined using a third language model. The third language model can be stored (e.g., in the language models 333) on the electronic device. In some examples, the third language model can be a class m-gram language model. The conditional probability of the predicted word given the one or more classes associated with the one or more words can be expressed as $\Pr(w_q|C_{q-m+1}^{q-1})$, where $C_{q-m+1}^{q-1}$ can refer to the one or more classes associated with the one or more words $W_{q-n+1}^{q-1}$ in the text input. In some examples, a class $c_i$ of the one or more classes $C_{q-m+1}^{q-1}$ can include one or more subclasses $\lambda_{k_q}$. In these examples, the one or more classes $C_{q-m+1}^{q-1}$ can comprise a set of strings of subclasses $\Lambda_{k_q-m+1}^{k_q-1}=\lambda_{k_q-m+1}\lambda_{k_q-m+2}\ldots\lambda_{k_q-1}$ each of length m−1, where m−1 can be the number of words in the one or more words in the text input.

At block 610 of process 600, an integrated probability of the predicted word and one or more subclasses associated with the predicted word can be determined based on the conditional probability of the predicted word given the one or more words, the probability of the predicted word within the corpus, and the conditional probability of the predicted word given the one or more classes. In some examples, the integrated probability can be determined using expression (16). In these examples, the integrated probability can be the joint probability of the predicted word $w_q$ and one or more subclasses $c_q=\{\lambda_{k_q}\}$ associated with the predicted word $w_q$ given the one or more words $W_{q-n+1}^{q-1}$ and the one or more classes $C_{q-m+1}^{q-1}$. The integrated probability can thus be determined by solving expression (16) using the conditional probability $\Pr(w_q|W_{q-n+1}^{q-1})$ of the predicted word given the one or more words determined at block 604, the probability $\Pr(w_q)$ of the predicted word within the corpus determined at block 606, and the conditional probability $\Pr(w_q|C_{q-m+1}^{q-1})$ of the predicted word given the one or more classes determined at block 608. In these examples, the integrated probability can inherit the properties of expression (16), as described above.

In some examples, the integrated probability determined at block 610 can be greater than the conditional probability $\Pr(w_q|W_{q-n+1}^{q-1})$ of the predicted word $w_q$ given the one or more words $W_{q-n+1}^{q-1}$ when the conditional probability $\Pr(w_q|C_{q-m+1}^{q-1})$ of the predicted word $w_q$ given the one or more classes $C_{q-m+1}^{q-1}$ is greater than the probability $\Pr(w_q)$ of the predicted word $w_q$ within the corpus. Conversely, the integrated probability determined at block 610 can be less than the conditional probability $\Pr(w_q|W_{q-n+1}^{q-1})$ of the predicted word $w_q$ given the one or more words $W_{q-n+1}^{q-1}$ when the conditional probability $\Pr(w_q|C_{q-m+1}^{q-1})$ of the predicted word $w_q$ given the one or more classes $C_{q-m+1}^{q-1}$ is less than the probability $\Pr(w_q)$ of the predicted word $w_q$ within the corpus. In some examples, the integrated probability determined at block 610 can be less dependent on the conditional probability $\Pr(w_q\ C_{q-m+1}^{q-1})$ of the predicted word given the one or more classes when the probability $\Pr(w_q)$ of the predicted word within the corpus is higher than when the probability $\Pr(w_q)$ of the predicted word within the corpus is lower.

Further, in examples where expression (16) is used to determine the integrated probability at block 610, the integrated probability can be based on the same assumptions (e.g., expressions (9), (10), and (13)) that were used to derive expression (16). In particular, the integrated probability determined at block 610 can be based on similar or identical assumptions as described above with respect to the integrated probability at block 412.

At block 612 of process 600, the predicted word can be displayed based on the integrated probability determined at block 610. For example, the predicted word can be displayed on the display (e.g., touch screen 246) of the electronic device. In some examples, it can be determined whether a predetermined criterion is met based on the integrated probability. In these examples, the predicted word can be displayed in response to determining that the predetermined criterion is met. Further, in some examples, the predicted word can be one of several predicted words displayed. In these examples, the position at which the predicted word is displayed on the electronic device can be based on the integrated probability. For example, the predicted word can be ranked with respect to other predicted words based on the integrated probability. The position at which the predicted word is displayed relative to other predicted words can be based on the rank of the predicted word with respect to other predicted words.

Referring now to FIG. 7, process 700 can be similar to process 600, described above. At block 702 of process 700, a text input from a user can be received. Block 702 can be similar or identical to block 602 of process 600, described above.

At block 704 of process 700, a conditional probability of a predicted word given one or more words in the text input can be determined using a first language model. Block 704 can be similar or identical to block 604 of process 600, described above. Block 704 (and similarly block 706, described below) can be performed using a text prediction module of the electronic device. The conditional probability of the predicted word given one or more words in the text input can be expressed as $Pr(w_q|W_{q-n+1}^{q-1})$ where $w_q$ can be the predicted word and $W_{q-n+1}^{q-1}$ can be the one or more words in the text input. In some examples, the first language model can be a word n-gram language model.

At block 706 of process 700, a weight can be applied to the conditional probability of the predicted word given the one or more words to obtain a weighted conditional probability of the predicted word given the one or more words. In some examples, the weight can be based on a conditional probability of the predicted word given one or more classes associated with the one or more words. Further, in some examples, the weight can be based on a probability of the predicted word within a corpus.

In some examples, the weighted conditional probability can be determined using expression (16), described above. In these examples, the applied weight can be the expression $$\left[\frac{Pr\left(w_q \mid C_{q-m+1}^{q-1}\right)}{Pr(w_q)}\right].$$

As shown in expression (16), the weight $$\left[\frac{Pr\left(w_q \mid C_{q-m+1}^{q-1}\right)}{Pr(w_q)}\right]$$

can be applied to the conditional probability $Pr(w_q|W_{q-n+1}^{q-1})$ of the predicted word given the one or more words by means of a dot product operation to obtain the weighted conditional probability. The weighted conditional probability can refer to the joint probability $Pr(w_q c_q|W_{q-n+1}^{q-1}C_{q-m+1}^{q-1})$ of the predicted word $w_q$ and one or more subclasses $c_q=\{\lambda_{k_q}\}$ associated with the predicted word $w_q$ given the one or more words $W_{q-n+1}^{q-1}$ and the one or more classes $C_{q-m+1}^{q-1}$, as expressed on the left side of expression (16).

With respect to the weight $$\left[\frac{Pr\left(w_q \mid C_{q-m+1}^{q-1}\right)}{Pr(w_q)}\right],$$

$Pr(w_q|C_{q-m+1}^{q-1})$ can refer to the conditional probability of the predicted word $w_q$ given the one or more classes $C_{q-m+1}^{q-1}$ associated with the one or more words $W_{q-n+1}^{q-1}$ and $Pr(w_q)$ can refer to the probability of the predicted word within a corpus. In some examples, block 706 can include determining the probability $Pr(w_q)$ of the predicted word $w_q$ within a corpus using a second language model. The second language model can be trained using the corpus. In some examples, the second language model can be a word unigram language model. In other examples, the second language model can be a word n-gram language model. In yet other examples, the second language model can be the same language model as the first language model used to determine the conditional probability at block 704. In some examples, block 706 can include determining the conditional probability $Pr(w_q|C_{q-m+1}^{q-1})$ of the predicted word $w_q$ given the one or more classes $C_{q-m+1}^{q-1}$ associated with the one or more words $W_{q-n+1}^{q-1}$ using a third language model. In some examples, the third language model can be a class m-gram language model. As described above, a class $c_i$ of the one or more classes $C_{q-m+1}^{q-1}$ can include one or more subclasses $\lambda_{k_q}$.

In examples where the weighted conditional probability is determined using expression (16), the weighted conditional probability of the predicted word can be proportional to the conditional probability $Pr(w_q\ C_{q-m+1}^{q-1})$ of the predicted word given the one or more words. Further, the weight $$\left[\frac{Pr\left(w_q \mid C_{q-m+1}^{q-1}\right)}{Pr(w_q)}\right]$$

can be proportional to the conditional probability $Pr(w_q|C_{q-m+1}^{q-1})$ of the predicted word given the one or more classes and inversely proportional to the probability $Pr(w_q)$ of the predicted word within the corpus.

Based on the applied weight $$\left[\frac{Pr\left(w_q \mid C_{q-m+1}^{q-1}\right)}{Pr(w_q)}\right],$$

the weighted conditional probability can be greater than the conditional probability $Pr(w_q|W_{q-n+1}^{q-1})$ of the predicted word given the one or more words when the conditional probability $Pr(w_q|C_{q-m+1}^{q-1})$ of the predicted word given the one or more classes is greater than the probability $Pr(w_q)$ of the predicted word within the corpus. Conversely, the weighted conditional probability can be less than the conditional probability $Pr(w_q|W_{q-n+1}^{q-1})$ of the predicted word given the one or more words when the conditional probability $Pr(w_q|C_{q-m+1}^{q-1})$ of the predicted word given the one or more classes is less than the probability $Pr(w_q)$ of the predicted word within the corpus.

Further, in examples where expression (16) is implemented to obtain the weighted conditional probability of block 508, the weighted conditional probability can be based on the same assumptions used to derive expression (16). In particular, the weighted conditional probability can be based on similar or identical assumptions as described above with respect to the integrated probability at block 412.

At block 708, the predicted word can be displayed based on the integrated probability. Block 708 can be similar or identical to block 612, described above.

7. Electronic Device

Figure 8:
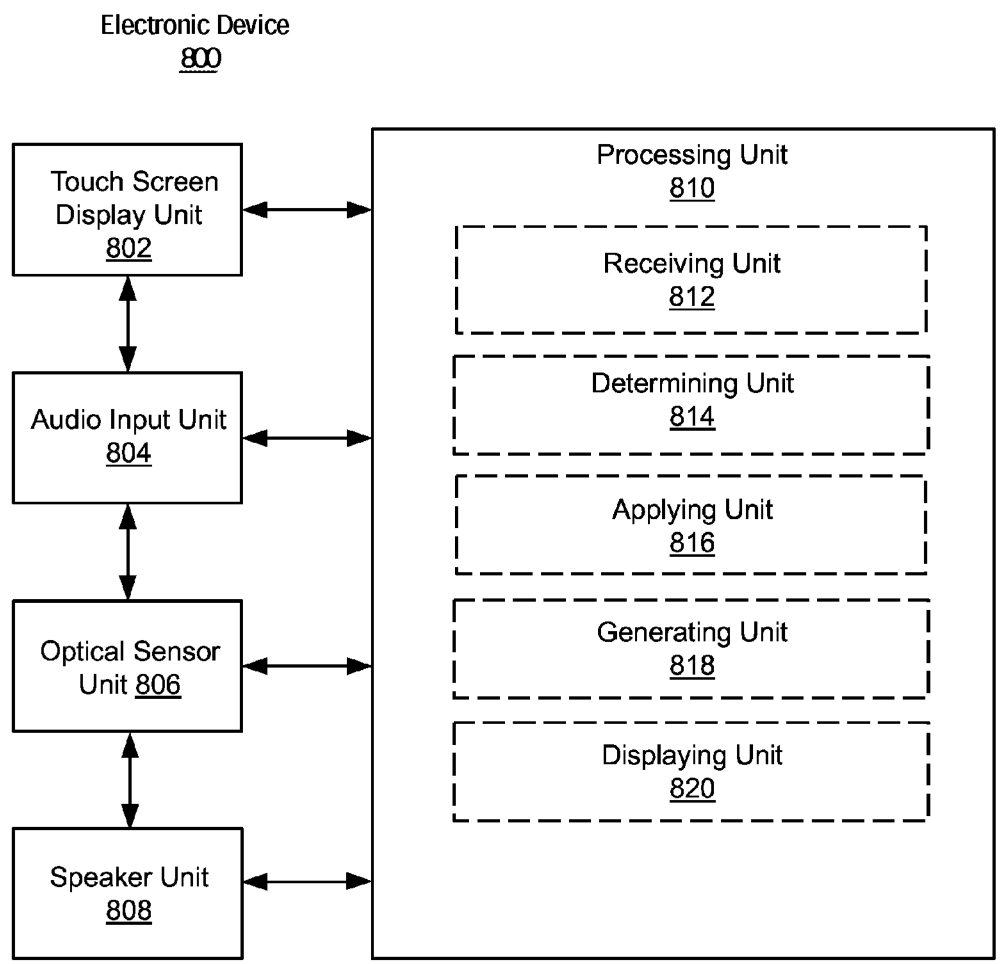
FIG. 8 illustrates a functional block diagram of an electronic device according to various examples.

FIG. 8 shows a functional block diagram of an electronic device 800 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 8 can be optionally combined, or separated into sub-blocks to implement the principles of the various described examples. Further, one or more of the functional blocks described in FIG. 8 can be optional. Therefore, the description herein optionally supports any possible combination, separation, or further definition of the functional blocks described herein.

As shown in FIG. 8, the electronic device 800 can include a touch screen display unit 802 configured to display a user interface (e.g., a virtual keyboard or a handwriting recognition interface), an audio input unit 804 configured to receive audio input (e.g., speech input), an optical sensor unit 806 configured to receive images or gesture input, and a speaker unit 808 configured to output audio (e.g., speech). The electronic device 800 can further include a processing unit 810 coupled to the touch screen display unit 802, the audio input unit 804, the optical sensor unit 806, and the speaker unit. In some examples, the processing unit 810 can include a receiving unit 812, a determining unit 814, an applying unit 816, a generating unit 818, and a displaying unit 820.

Processing unit 810 is configured to receive (e.g., from the touch screen display unit 802, the audio input unit 804, or the optical sensor unit 806 and using the receiving unit 812) a discourse input from a user. Processing unit 810 is configured to determine (e.g., using the determining unit 814), using a first language model, a conditional probability of a candidate word in the discourse input given one or more words in the discourse input. Processing unit 810 is configured to determine (e.g., using the determining unit 814), using a second language model, a probability of the candidate word within a corpus. Processing unit 810 is configured to determine (e.g., using the determining unit 814), using a third language model, a conditional probability of the candidate word given one or more classes associated with the one or more words. Processing unit 810 is configured to determine (e.g., using the determining unit 814) an integrated probability of the candidate word and one or more subclasses associated with the candidate word based on the conditional probability of the candidate word given the one or more words the probability of the candidate word within the corpus and the conditional probability of the candidate word given the one or more classes. Processing unit 810 is configured to determine (e.g., using the determining unit 814) a text string corresponding to the discourse input based on the integrated probability. Processing unit 810 is configured to generate (e.g., using the touch screen display unit 802 or the speaker unit 808 and using the generating unit 818) an output based on the text string.

In some examples, the integrated probability is a joint probability of the candidate word and the one or more subclasses associated with the candidate word given the one or more words and the one or more classes.

In some examples, the integrated probability is determined based on assuming that a conditional probability of a subclass associated with the candidate word given the candidate word, the one or more words, and the one or more classes is equal to a conditional probability of the subclass associated with the candidate word given the candidate word and the one or more classes.

In some examples, the integrated probability is determined based on assuming that a conditional probability of the candidate word given a subclass associated with the candidate word and the one or more classes is equal to the conditional probability of the candidate word given the subclass associated with the candidate word.

In some examples, the integrated probability is determined based on assuming that a conditional probability of the one or more classes given the candidate word and the one or more words is equal to a conditional probability of the one or more classes given the one or more words.

In some examples, a class of the one or more classes includes one or more subclasses.

In some examples, the integrated probability is greater than the conditional probability of the candidate word given the one or more words when the conditional probability of the candidate word given the one or more classes is greater than the probability of the candidate word within the corpus.

In some examples, the integrated probability is less than the conditional probability of the candidate word given the one or more words when the conditional probability of the candidate word given the one or more classes is less than the probability of the candidate word within the corpus.

In some examples, the integrated probability is determined at least in part by dividing the conditional probability of the candidate word given the one or more classes by the probability of the candidate word within the corpus.

In some examples, the integrated probability is less dependent on the conditional probability of the candidate word given the one or more classes when the probability of the candidate word within the corpus is higher than when the probability of the candidate word within the corpus is lower.

In some examples, the first language model is a word n-gram language model. In some examples, the first language model and the second language model are a same language model. In some examples, the third language model is a class m-gram language model.

In some examples, processing unit 810 is configured to receive (e.g., from the touch screen display unit 802, the audio input unit 804, or the optical sensor unit 806 and using the receiving unit 812) a discourse input from a user. Processing unit 810 is configured to determine (e.g., using the determining unit 814), using a first language model, a conditional probability of a candidate word in the discourse input given one or more words in the discourse input. Processing unit 810 is configured to apply (e.g., using the applying unit 816) a weight to the conditional probability of the candidate word given the one or more words to obtain a weighted conditional probability of the candidate word given the one or more words. The weight is based on a conditional probability of the candidate word given one or more classes associated with the one or more words. Processing unit 810 is configured to determine (e.g., using the determining unit 814) a text string corresponding to the discourse input based on the weighted conditional probability of the candidate word. Processing unit 810 is configured to generate (e.g., using the touch screen display unit 802 or the speaker unit 808 and using the generating unit 818) an output based on the text string.

In some examples, the weight is further based on a probability of the candidate word within a corpus. In some examples, the weight is inversely proportional to the probability of the candidate word within the corpus. In some examples, the weight comprises the conditional probability of the candidate word given the one or more classes divided by the probability of the candidate word within the corpus.

In some examples, the weighted conditional probability of the candidate word is greater than the conditional probability of the candidate word given the one or more words when the conditional probability of the candidate word given the one or more classes is greater than the probability of the candidate word within the corpus. In some examples, the weighted conditional probability of the candidate word is less than the conditional probability of the candidate word given the one or more words when the conditional probability of the candidate word given the one or more classes is less than the probability of the candidate word within the corpus.

In some examples, the weighted conditional probability of the candidate word is a joint probability of the candidate word and one or more subclasses associated with the candidate word given the one or more words and the one or more classes.

In some examples, the weight is proportional to the conditional probability of the candidate word given the one or more classes. In some examples, the weighted conditional probability of the candidate word is proportional to the conditional probability of the candidate word given the one or more words.

In some examples, the weighted conditional probability of the candidate word comprises a dot product of the weight and the conditional probability of the candidate word given the one or more words.

In some examples, the weighted conditional probability of the candidate word is based on an assumption that a conditional probability of a subclass associated with the candidate word given the candidate word, the one or more words, and the one or more classes is equal to a conditional probability of the subclass associated with the candidate word given the candidate word and the one or more classes. In some examples, the weighted conditional probability of the candidate word is based on an assumption that a conditional probability of the candidate word given a subclass associated with the candidate word and the one or more classes is equal to a conditional probability of the candidate word given the subclass associated with the candidate word. In some examples, the weighted conditional probability of the candidate word is based on an assumption that a conditional probability of the one or more classes given the candidate word and the one or more words is equal to a conditional probability of the one or more classes given the one or more words.

Figure 9:
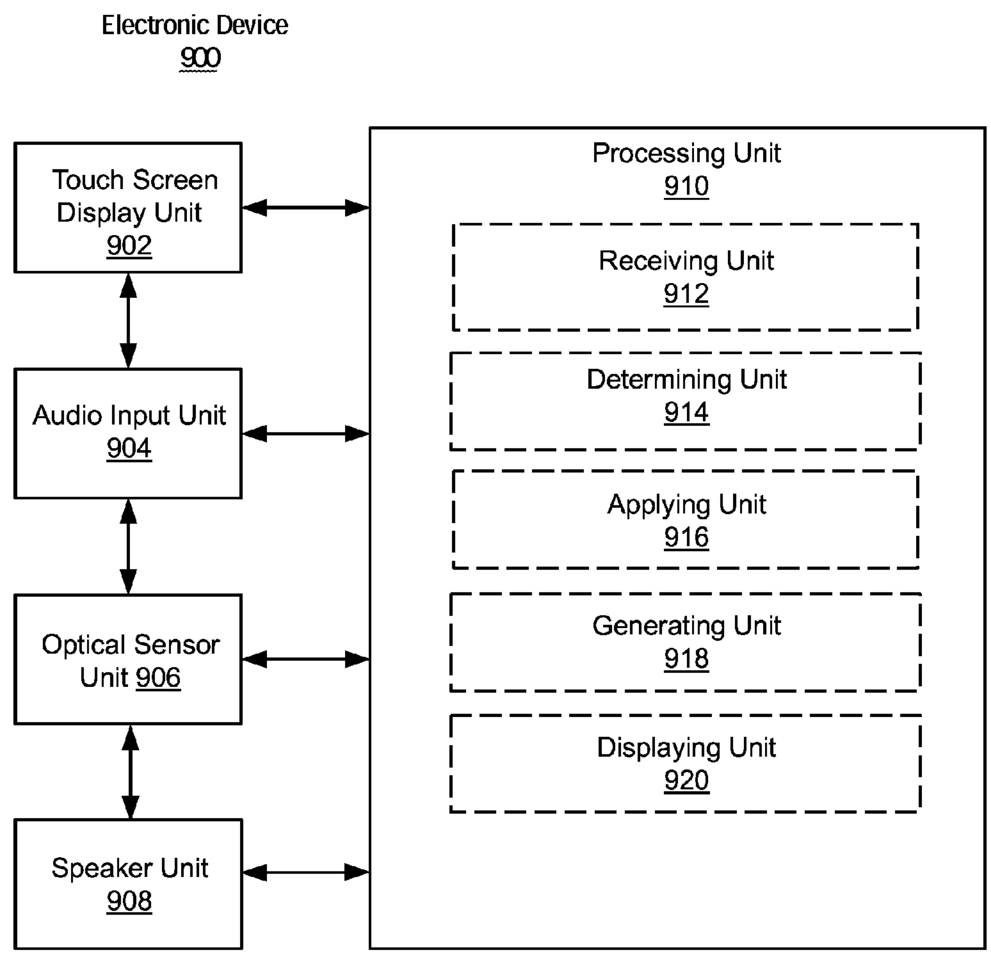
FIG. 9 illustrates a functional block diagram of an electronic device according to various examples.

FIG. 9 shows a functional block diagram of an electronic device 900 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 9 can be optionally combined, or separated into sub-blocks to implement the principles of the various described examples. Further, one or more of the functional blocks described in FIG. 9 can be optional. Therefore, the description herein optionally supports any possible combination, separation, or further definition of the functional blocks described herein.

As shown in FIG. 9, the electronic device 900 can include a touch screen display unit 902 configured to display a user interface (e.g., a virtual keyboard or a handwriting recognition interface), an audio input unit 904 configured to receive audio input (e.g., speech input), an optical sensor unit 906 configured to receive images or gesture input, and a speaker unit 908 configured to output audio (e.g., speech). The electronic device 900 can further include a processing unit 910 coupled to the touch screen display unit 902, the audio input unit 904, the optical sensor unit 906, and the speaker unit. In some examples, the processing unit 910 can include a receiving unit 912, a determining unit 914, an applying unit 916, a generating unit 918, and a displaying unit 920.

Processing unit 910 is configured to receive (e.g., from the touch screen display unit 902, the audio input unit 904, or the optical sensor unit 906, and using the receiving unit 912) receiving a text input from a user. Processing unit 910 is configured to determine (e.g., using the determining unit 914), using a first language model, a conditional probability of a predicted word given one or more words in the text input. Processing unit 910 is configured to determine (e.g., using the determining unit 914), using a second language model, a probability of the predicted word within a corpus. Processing unit 910 is configured to determine (e.g., using the determining unit 914), using a third language model, a conditional probability of the predicted word given one or more classes associated with the one or more words. Processing unit 910 is configured to determine (e.g., using the determining unit 914) an integrated probability of the predicted word and one or more subclasses associated with the predicted word based on the conditional probability of the predicted word given the one or more words, the probability of the predicted word within the corpus, and the conditional probability of the predicted word given the one or more classes. Processing unit 910 is configured to display (e.g., using the touch screen display unit and using the displaying unit 920) the predicted word based on the integrated probability.

In some examples, the integrated probability is a joint probability of the predicted word and the one or more subclasses associated with the predicted word given the one or more words and the one or more classes.

In some examples, the integrated probability is determined based on assuming that a conditional probability of a subclass associated with the predicted word given the predicted word, the one or more words, and the one or more classes is equal to a conditional probability of the subclass associated with the predicted word given the predicted word and the one or more classes.

In some examples, the integrated probability is determined based on assuming that a conditional probability of the predicted word given a subclass associated with the predicted word and the one or more classes is equal to the conditional probability of the predicted word given the subclass associated with the predicted word.

In some examples, the integrated probability is determined based on assuming that a conditional probability of the one or more classes given the predicted word and the one or more words is equal to a conditional probability of the one or more classes given the one or more words.

In some examples, a class of the one or more classes includes one or more subclasses.

In some examples, the integrated probability is greater than the conditional probability of the predicted word given the one or more words when the conditional probability of the predicted word given the one or more classes is greater than the probability of the predicted word within the corpus.

In some examples, the integrated probability is less than the conditional probability of the predicted word given the one or more words when the conditional probability of the predicted word given the one or more classes is less than the probability of the predicted word within the corpus.

In some examples, the integrated probability is determined at least in part by dividing the conditional probability of the predicted word given the one or more classes by the probability of the predicted word within the corpus.

In some examples, the integrated probability is less dependent on the conditional probability of the predicted word given the one or more classes when the probability of the predicted word within the corpus is higher than when the probability of the predicted word within the corpus is lower.

In some examples, the first language model is a word n-gram language model. In some examples, the first language model and the second language model are a same language model. In some examples, the third language model is a class m-gram language model.

In some examples, processing unit 810 is configured to receive (e.g., from the touch screen display unit 802, the audio input unit 804, or the optical sensor unit 806 and using the receiving unit 812) receive a text input from a user. Processing unit 810 is configured to determine (e.g., using the determining unit 814), using a first language model, a conditional probability of a predicted word given one or more words in the text input. Processing unit 810 is configured to apply (e.g., using the applying unit 816) a weight to the conditional probability of the predicted word given the one or more words to obtain a weighted conditional probability of the predicted word given the one or more words. The weight is based on a conditional probability of the predicted word given one or more classes associated with the one or more words. Processing unit 810 is configured to display (e.g., using the touch screen display unit and using the displaying unit 820) the predicted word based on the integrated probability.

In some examples, the weight is further based on a probability of the predicted word within a corpus. In some examples, the weight is inversely proportional to the probability of the predicted word within the corpus. In some examples, the weight comprises the conditional probability of the predicted word given the one or more classes divided by the probability of the predicted word within the corpus.

In some examples, the weighted conditional probability of the predicted word is greater than the conditional probability of the predicted word given the one or more words when the conditional probability of the predicted word given the one or more classes is greater than the probability of the predicted word within the corpus.

In some examples, the weighted conditional probability of the predicted word is less than the conditional probability of the predicted word given the one or more words when the conditional probability of the predicted word given the one or more classes is less than the probability of the predicted word within the corpus. In some examples, the weighted conditional probability of the predicted word is a joint probability of the predicted word and one or more subclasses associated with the predicted word given the one or more words and the one or more classes.

In some examples, the weight is proportional to the conditional probability of the predicted word given the one or more classes.

In some examples, the weighted conditional probability of the predicted word is proportional to the conditional probability of the predicted word given the one or more words. In some examples, the weighted conditional probability of the predicted word comprises a dot product of the weight and the conditional probability of the predicted word given the one or more words.

In some examples, the weighted conditional probability of the predicted word is based on an assumption that a conditional probability of a subclass associated with the predicted word given the predicted word, the one or more words, and the one or more classes is equal to a conditional probability of the subclass associated with the predicted word given the predicted word and the one or more classes. In some examples, the weighted conditional probability of the predicted word is based on an assumption that a conditional probability of the predicted word given a subclass associated with the predicted word and the one or more classes is equal to a conditional probability of the predicted word given the subclass associated with the predicted word. In some examples, the weighted conditional probability of the predicted word is based on an assumption that a conditional probability of the one or more classes given the predicted word and the one or more words is equal to a conditional probability of the one or more classes given the one or more words.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A method for processing discourse input comprising:

at an electronic device with a processor and memory storing one or more programs for execution by the processor:

receiving a discourse input from a user;

determining a text string corresponding to the discourse input, wherein determining the text string comprises:

determining, using a first language model, a conditional probability of a candidate word in the discourse input given one or more words in the discourse input;

determining, using a second language model, a probability of the candidate word within a corpus;

determining, using a third language model, a conditional probability of the candidate word given one or more classes associated with the one or more words; and determining an integrated probability of the candidate word and one or more subclasses associated with the candidate word based on:

the conditional probability of the candidate word given the one or more words;

the probability of the candidate word within the corpus; and the conditional probability of the candidate word given the one or more classes, wherein the text string is based on the integrated probability; and generating an output based on the text string.

2. The method of claim 1, wherein the integrated probability is a joint probability of the candidate word and the one or more subclasses associated with the candidate word given the one or more words and the one or more classes.

3. The method of claim 1, wherein the integrated probability is determined based on assuming that a conditional probability of a subclass associated with the candidate word given the candidate word, the one or more words, and the one or more classes is equal to a conditional probability of the subclass associated with the candidate word given the candidate word and the one or more classes.

4. The method of claim 1, wherein the integrated probability is determined based on assuming that a conditional probability of the candidate word given a subclass associated with the candidate word and the one or more classes is equal to the conditional probability of the candidate word given the subclass associated with the candidate word.

5. The method of claim 1, wherein the integrated probability is determined based on assuming that a conditional probability of the one or more classes given the candidate word and the one or more words is equal to a conditional probability of the one or more classes given the one or more words.

6. The method of claim 1, wherein a class of the one or more classes includes one or more subclasses.

7. The method of claim 1, wherein the integrated probability is determined at least in part by dividing the conditional probability of the candidate word given the one or more classes by the probability of the candidate word within the corpus.

8. The method of claim 1, wherein the integrated probability is less dependent on the conditional probability of the candidate word given the one or more classes when the probability of the candidate word within the corpus is higher than when the probability of the candidate word within the corpus is lower.

9. The method of claim 1, wherein the first language model and the second language model are a same language model.

10. A method for processing discourse input comprising:

at an electronic device with a processor and memory storing one or more programs for execution by the processor:

receiving a discourse input from a user;

determining a text string corresponding to the discourse input, wherein determining the text string comprises:

determining, using a first language model, a conditional probability of a candidate word in the discourse input given one or more words in the discourse input; and applying a weight to the conditional probability of the candidate word given the one or more words to obtain a weighted conditional probability of the candidate word given the one or more words, wherein the weight is based on a conditional probability of the candidate word given one or more classes associated with the one or more words, and wherein the text string is based on the weighted conditional probability of the candidate word; and generating an output based on the text string.

11. The method of claim 10, wherein the weight is further based on a probability of the candidate word within a corpus.

12. The method of claim 11, further comprising:

determining, using a second language model, the probability of the candidate word within the corpus.

13. The method of claim 12, wherein the first language model and the second language model are a same language model.

14. The method of claim 11, wherein the weight is inversely proportional to the probability of the candidate word within the corpus.

15. The method of claim 11, wherein the weight comprises the conditional probability of the candidate word given the one or more classes divided by the probability of the candidate word within the corpus.

16. The method of claim 15, wherein the weighted conditional probability of the candidate word comprises a dot product of the weight and the conditional probability of the candidate word given the one or more words.

17. The method of claim 10, further comprising:

determining, using a third language model, the conditional probability of the candidate word given the one or more classes.

18. The method of claim 10, wherein the weight is proportional to the conditional probability of the candidate word given the one or more classes.

19. The method of claim 10, wherein the weighted conditional probability of the candidate word is proportional to the conditional probability of the candidate word given the one or more words.

20. The method of claim 10, wherein the weighted conditional probability of the candidate word is based on an assumption that a conditional probability of a subclass associated with the candidate word given the candidate word, the one or more words, and the one or more classes is equal to a conditional probability of the subclass associated with the candidate word given the candidate word and the one or more classes.

21. The method of claim 10, wherein the weighted conditional probability of the candidate word is based on an assumption that a conditional probability of the candidate word given a subclass associated with the candidate word and the one or more classes is equal to a conditional probability of the candidate word given the subclass associated with the candidate word.

22. The method of claim 10, wherein the weighted conditional probability of the candidate word is based on an assumption that a conditional probability of the one or more classes given the candidate word and the one or more words is equal to a conditional probability of the one or more classes given the one or more words.

23. A non-transitory computer-readable storage medium comprising instructions for causing one or more processor to:

receiving a discourse input from a user;

determining a text string corresponding to the discourse input, wherein determining the text string comprises:

determining, using a first language model, a conditional probability of a candidate word in the discourse input given one or more words in the discourse input; and applying a weight to the conditional probability of the candidate word given the one or more words to obtain a weighted conditional probability of the candidate word given the one or more words, wherein the weight is based on a conditional probability of the candidate word given one or more classes associated with the one or more words, and wherein the text string is based on the weighted conditional probability of the candidate word; and generating an output based on the text string.

24. An electronic device comprising:

one or more processors;

memory; and one or more programs, wherein the one or more programs are stored in the memory and configured to be executed by the one or more processors, the one or more programs including instructions for:

receiving a discourse input from a user;

determining a text string corresponding to the discourse input, wherein determining the text string comprises:

determining, using a first language model, a conditional probability of a candidate word in the discourse input given one or more words in the discourse input; and applying a weight to the conditional probability of the candidate word given the one or more words to obtain a weighted conditional probability of the candidate word given the one or more words, wherein the weight is based on a conditional probability of the candidate word given one or more classes associated with the one or more words, and wherein the text string is based on the weighted conditional probability of the candidate word; and generating an output based on the text string.

* * * * *